United States Patent
Cooper et al.

(10) Patent No.: US 9,953,280 B2
(45) Date of Patent: Apr. 24, 2018

(54) INDUSTRY-SPECIFIC WORKFLOWS IN A MANUFACTURING EXECUTION SYSTEM WITH PREMIER INTEGRATION

(71) Applicant: Rockwell Automation Technologies, Inc., Mayfield Heights, OH (US)

(72) Inventors: David Cooper, Cedar Park, TX (US); Kevin Chao, Mountain View, CA (US); Keith Chambers, Scott's Valley, CA (US); Richard Sze, Saratoga, CA (US); Crisler Moor, San Jose, CA (US); Brandon E. Henning, Palmyra, VA (US); Suryanarayana Murthy Bobba, Los Altos, CA (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 507 days.

(21) Appl. No.: 13/677,039

(22) Filed: Nov. 14, 2012

(65) Prior Publication Data
US 2013/0123965 A1 May 16, 2013

Related U.S. Application Data

(60) Provisional application No. 61/560,222, filed on Nov. 15, 2011.

(51) Int. Cl.
*G06Q 10/06* (2012.01)
*G05B 15/02* (2006.01)
(Continued)

(52) U.S. Cl.
CPC ......... *G06Q 10/0631* (2013.01); *G05B 15/02* (2013.01); *G05B 19/042* (2013.01);
(Continued)

(58) Field of Classification Search
CPC ...... G06Q 10/0631; G05B 2219/31432; G06F 17/30442; G06F 17/30539; G06F 17/30563; G06F 17/30592
See application file for complete search history.

(56) References Cited

U.S. PATENT DOCUMENTS 6,104,281 A * 8/2000 Heinrich ............ G08B 13/1409
  116/137 A
6,615,199 B1 * 9/2003 Bowman-Amuah ........... 706/50
(Continued)

FOREIGN PATENT DOCUMENTS

EP 1072967 A2 1/2001
EP 1906623 A1 4/2008

OTHER PUBLICATIONS

Baïna, Panetto, Benali, "A Product Oriented Modelling Concept, Holons for systems Synchronisation and Interoperability", from Eds: Yannis Manolopoulos, Joaquim Filipe, Panos Constantopoulos, José Cordeiro, Enterprise Information Systems, 8th Internatonal Conference, ICEIS 2006, May 27, 2006, selected papers, Springer, Berlin, 2006, pp. 293-308.*

(Continued)

*Primary Examiner* — Crystal J Barnes-Bullock
(74) *Attorney, Agent, or Firm* — Amin, Turocy & Watson, LLP

(57) ABSTRACT

A Manufacturing Execution System (MES) is provided that leverages industry-specific workflows to process business requests. The MES system can maintain activity sets representing industry-specific workflows that can be selected and executed in order to satisfy business-driven goals. The activity sets can comprise both business-level and control-level operations, and can be configured using an intuitive graphical interface that mitigates the need for low-level programming by the end user. Some features of the MES
(Continued)

system are enabled or disabled based on data type compatibility with devices in communication with the MES system.

20 Claims, 14 Drawing Sheets

(51) Int. Cl.
  *G06F 17/30* (2006.01)
  *G05B 19/042* (2006.01)
(52) U.S. Cl.
  CPC .. *G06F 17/30442* (2013.01); *G06F 17/30539* (2013.01); *G05B 2219/31432* (2013.01)

(56) References Cited

U.S. PATENT DOCUMENTS

| | | | | |
|---|---|---|---|---|
| 6,678,566 | B2* | 1/2004 | Ho | G05B 9/03 700/21 |
| 6,965,895 | B2* | 11/2005 | Smith | G06Q 10/06 |
| 7,142,938 | B2* | 11/2006 | Chi | G05B 19/41865 700/106 |
| 7,184,852 | B2* | 2/2007 | Lee | G06Q 10/08 700/115 |
| 7,305,278 | B2* | 12/2007 | Enright | G06Q 10/06 700/103 |
| 7,317,959 | B2* | 1/2008 | Pfander | G06F 9/541 700/83 |
| 7,778,717 | B2 | 8/2010 | Bachman et al. | |
| 7,934,252 | B2 | 4/2011 | Chung et al. | |
| 7,974,723 | B2 | 7/2011 | Moyne et al. | |
| 8,165,707 | B2* | 4/2012 | Enright | G06Q 10/06 700/103 |
| 8,417,367 | B1 | 4/2013 | Logsdon et al. | |
| 8,452,810 | B2 | 5/2013 | Copello et al. | |
| 8,676,721 | B2* | 3/2014 | Piovesan et al. | 706/11 |
| 8,843,238 | B2 | 9/2014 | Wenzel et al. | |
| 2002/0138316 | A1 | 9/2002 | Katz et al. | |
| 2003/0149608 | A1 | 8/2003 | Kall et al. | |
| 2004/0117358 | A1* | 6/2004 | von Kaenel et al. | 707/3 |
| 2005/0160412 | A1 | 7/2005 | Thurner | |
| 2005/0256779 | A1* | 11/2005 | Ni | G06Q 30/06 705/26.82 |
| 2005/0267882 | A1 | 12/2005 | Aupperlee et al. | |
| 2006/0106473 | A1 | 5/2006 | Enright et al. | |
| 2007/0078696 | A1 | 4/2007 | Hardin et al. | |
| 2008/0154412 | A1 | 6/2008 | Steinbach et al. | |
| 2009/0043404 | A1 | 2/2009 | Moor et al. | |
| 2009/0088871 | A1 | 4/2009 | Moor et al. | |
| 2009/0276270 | A1 | 11/2009 | Karnataka | |
| 2010/0191579 | A1 | 7/2010 | Sudarshan et al. | |
| 2010/0205271 | A1 | 8/2010 | Callaghan | |
| 2011/0258262 | A1 | 10/2011 | Bezdicek et al. | |
| 2011/0258359 | A1 | 10/2011 | Bezdicek et al. | |
| 2015/0289123 | A1 | 10/2015 | Shatzkamer et al. | |

OTHER PUBLICATIONS

M. Giriraj, Dr. S. Muthu, "Layerless Manufacturing & SAP—Creating Responsive Shop Floor in teh Supply Chain", International Jouornal of Engineering and Technology, vol. 2(2), 2010, pp. 59-64.*
Paul Burnham, "Using ISO/IEC 19770-2 Software Identification Tags to Enhance Software Asset Management", published by Agnitio Advisors, Inc. Los Gatos CA, 2009, pp. 1-8.*
Manfred Grauer, Sachin Karadgi, Daniel Metz, Walter Schafer, "An Approach for Real-Time Control of Enterprise Processes in Manufacturing using a Rule-Based System", Multikonferenz Wirtschaftsinformatik 2010 (MKWI 2010)—Enterprise Resource Planning and Transformation von ERP-Systemen, Feb. 23, 2010, pp. 1511-1522.*
A. Juels, "RFID Security and Privacy: A Research Survey", IEEE Journal on Selected Areas in Communications (vol. 24 , Issue: 2 ), Feb. 6, 2006, pp. 381-394.*
Xiaoyong Su, Chi-Cheng Chu, Prabhu, B.S., Gadh, R., "On the Identification Device Management and Data Capture via WinRFID1 Edge-Server", Systems Journal, IEEE (vol. 1 , Issue: 2 ), Nov. 27, 2007, pp. 95-104.*
Manfred Grauer, Sachin Karadgi, Daniel Metz, Walter Schafer, "An Approach for Real-Time Control of Enterprise Processes in Manufacturing using a Rule-Based System", Multikonferenz Wirtschaftsinformatik 2010 (MKWI 2010)—Enterprise Resource Planning und Transformation von ERP-Systemen, Feb. 23, 2010, pp. 1511-1522.*
OMAC Packaging Workgroup (ConnectPack), "Guidelines for Packaging Machinery Automation, Version 3.1", Open Modular Architecture Controls (OMAC) Users Group, May 11, 2006, pp. 1-134.*
Staff Wybron, "Infogate User Manual", published by Wybron, Inc., 2009, pp. 1-49.*
Jouko Virta, "Application Integration for Prodution Operations Management Using OPC Unified Architecture", Master's Thesis published by Faculty of Electronics, Communications and Automation, Aalto University, School of Science and Technology, Espoo, Finland, 2010, pp. 1-59.*
European Search Report for European Patent Application No. EP12192874 dated Feb. 6, 2013, 6 pages.
European Search Report for European Patent Application No. EP12192876 dated Feb. 6, 2013, 6 pages.
European Search Report for European Patent Application No. EP12192875 dated Apr. 3, 2013, 14 pages.
Mesa International. "MES Explained : A High Level Vision", White Paper No. 6, Sep. 1997, 25 pages.
Karnouskos, et al. "Integration of Legacy Devices in the Future SOA-Based Factory", Information Control Problems in Manufacturing, vol. 13, No. 1, Jun. 2009, 6 pages.
Jammes, et al. "Service-oriented architectures for devices—the SIRENA view", 2005 3rd IEEE International Conference on Industrial Informatics, Perth, Australia, Aug. 2005, 8 pages.
Feldhorst, et al. "Integration of a legacy automation system into a SOA for devices". IEEE Conference on Emerging Technologies & Factory Automation, Sep. 2009, 8 pages.
Office Action dated Sep. 24, 2014 for U.S. Appl. No. 13/677,019, 38 pages.
European Search Report for European Patent Application No. 12192874.1 dated Feb. 5, 2014, 6 pages.
Final Office Action dated Feb. 6, 2015 for U.S. Appl. No. 13/677,019, 36 pages.
Office Action dated Mar. 5, 2015 for U.S. Appl. No. 13/676,973, 44 pages.
Office Action dated Jul. 8, 2015 for U.S. Appl. No. 13/677,019, 38 pages.
Office Action for U.S. Appl. No. 13/676,998, dated Oct. 23, 2015, 40 pages.
Office Action for U.S. Appl. No. 13/677,019, dated Nov. 3, 2015, 36 pages.
Office Action for U.S. Appl. No. 13/676,973, dated Aug. 14, 2015, 39 pages.
Notice of Allowance for U.S. Appl. No. 13/676,998, dated Oct. 20, 2016, 29 pages.
Office Action for U.S. Appl. No. 13/676,998, dated Jul. 1, 2016, 29 pages.
Notice of Allowance for U.S. Appl. No. 13/676,973, dated Sep. 6, 2016, 49 pages.
Office Action for U.S. Appl. No. 13/676,973, dated May 5, 2016, 44 pages.
Final Office Action for U.S. Appl. No. 13/676,998, dated Jul. 1, 2016, 29 pages.
European Office Action for European Application Serial No. 12192876.6 dated Jun. 4, 2015, 7 pages.
European Office Action for European Application Serial No. 12192875.8 dated Apr. 21, 2016, 6 pages.

* cited by examiner

INDUSTRY-SPECIFIC WORKFLOWS IN A MANUFACTURING EXECUTION SYSTEM WITH PREMIER INTEGRATION

RELATED APPLICATIONS

This application claims the benefit of U.S. Provisional Patent Application Ser. No. 61/560,222, filed on Nov. 15, 2011, and entitled "INDUSTRY-SPECIFIC WORKFLOWS IN A MANUFACTURING SYSTEM WITH PREMIER INTEGRATION." The entirety of this application is incorporated herein by reference.

TECHNICAL FIELD

The subject application relates generally to industrial control, and more particularly, to the use of graphical activity sets to perform Manufacturing and Execution System (MES) functions in response to specified business objectives

BACKGROUND

Industrial controllers and their associated control programming are central to the operation of modern industrial automation systems. These controllers interact with field devices on the plant floor to carry out controlled processes relating to such objectives as manufacture of a product, material handling, batch processing, waste water treatment, and other such processes. Industrial controllers store and execute user-defined control programs to effect decision-making in connection with the controlled process. Such programs can include, but are not limited to, ladder logic, sequential function charts, function block diagrams, structured text, or other such platforms.

The various control systems that make up an enterprise are sometimes collectively managed by a Manufacturing Execution System (MES), which monitors real-time data from the plant floor and issues control management instructions in view of higher level business considerations, such as order management, resource management, inventory, scheduling, etc.

Plant floor operations, including control of industrial processes by the industrial controllers described above, represent one component of a larger business enterprise. On a higher level, business operations such as financial analysis, marketing, sales, order management, long term business planning, resource management, inventory management, and the like collectively represent another element of the enterprise. Many organizations employ an Enterprise Resource Planning (ERP) system or similar business system to correlate and manage these business level functions in a cohesive manner.

Although business level and plant floor level operations are related to and dependent upon one another, the two levels are often only loosely integrated, with slow (e.g., non-real-time, non-automated) information exchange between the two. Moreover, efforts to integrate higher level business systems with plant-side control can be hindered by the need for specialized programming code, necessitating involvement of experienced programmers or IT personnel who may have limited understanding of both the business-side and plant-side operations compared with management or factory personnel.

The above-described deficiencies of today's industrial control and business systems are merely intended to provide an overview of some of the problems of conventional systems, and are not intended to be exhaustive. Other problems with conventional systems and corresponding benefits of the various non-limiting embodiments described herein may become further apparent upon review of the following description.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

One or more embodiments of the present disclosure relate to the use of industry-specific workflows to facilitate execution of business goals on an MES system. To this end, industry- and process-specific activity sets can be provided that define workflows capable of execution by the MES system. These activity sets can encompass both business-level operations and control-level operations, thereby facilitating workflow coordination between all levels of an enterprise in the service of satisfying a particular business objective. Activity sets can be viewed and modified using an intuitive graphical interface, thereby allowing non-programmers to build meaningful MES workflows without the assistance of an experienced programmer.

According to one or more embodiments, an MES system can include a library of generalized activity sets corresponding to executable control and/or business workflows. These activity sets can be classified according to industry, process, and any suitable subcategories, thereby allowing industry-specific rules or standards to be encoded in the activity sets. Generalized activity sets can be customized for use with a particular control context through tag binding. When a message defining a business goal or objective is received by the MES system from a business-level system (e.g., an ERP system), the message can be analyzed and matched to an activity set by the MES system, which can then execute the selected activity set to facilitate satisfaction of the business objective. Relevant reporting can be provided to the business level in connection with execution of the activity set at a desired degree of granularity.

Moreover, the MES system allows workflows to be built graphically from industry-specific functional blocks that combine process control, visualization, and reporting configurations into a comprehensive reusable element Use of these functional blocks can allow the MES system to be configured without the need for low-level programming.

Also, according to one or more embodiments, integration between the MES system, control systems, and visualization systems can be simplified by the enablement of MES configuration features that become active when the equipment comprising the systems are provide by a common manufacturer. For example, if the controllers and/or visualization systems comprising the control system are made by the same vendor as the MES system, features can be enabled that allow the control system and MES system to leverage a common namespace and data type for tag referencing and tag auto-discovery. The MES system can also enable additional security features in response to detection of a particular vendor's controller.

To the accomplishment of the foregoing and related ends, certain illustrative aspects are described herein in connection with the following description and the annexed drawings.

DETAILED DESCRIPTION

Figure 1:
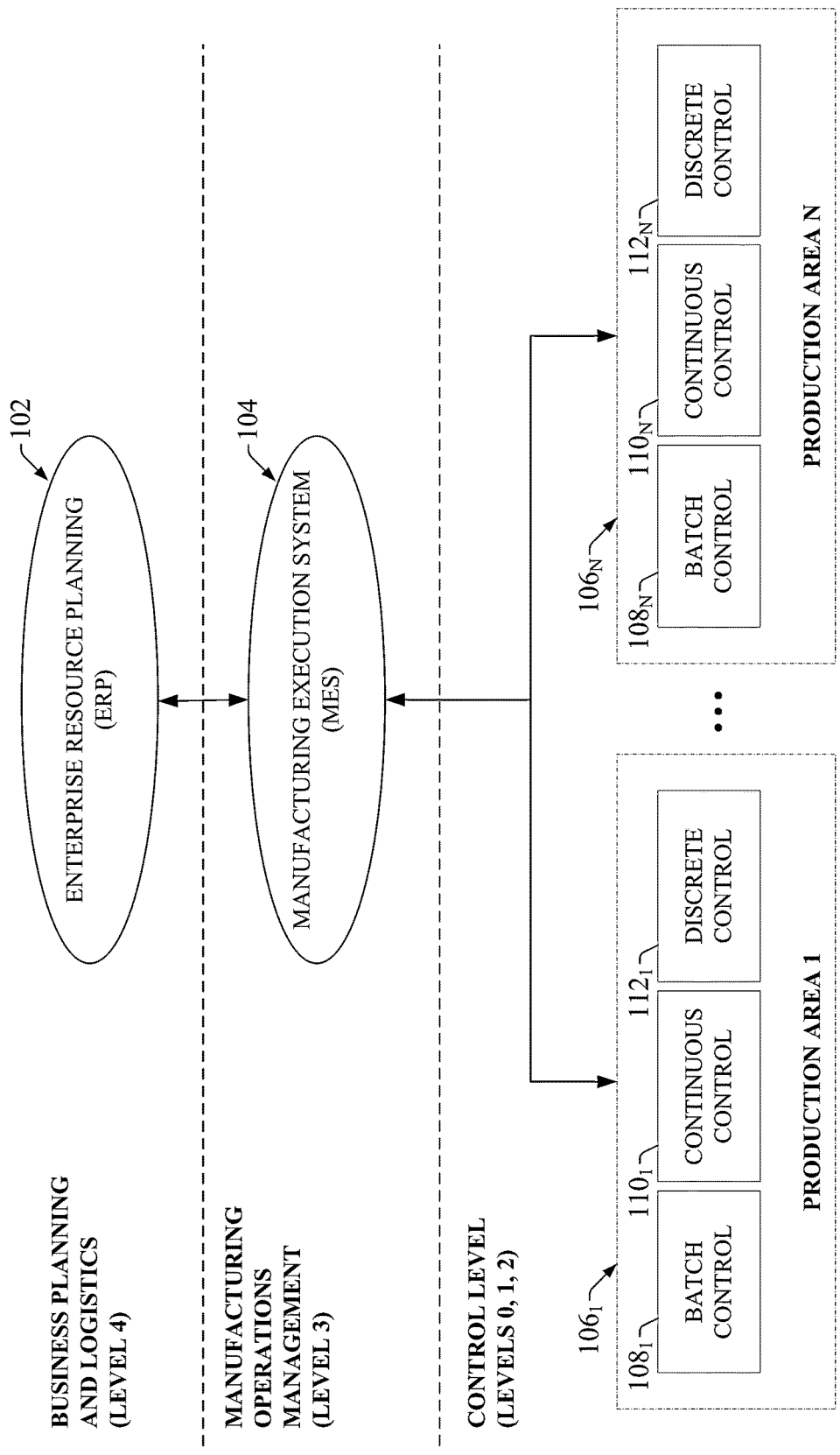
FIG. 1 is a high-level overview the relationships between an ERP system, an MES system, and control systems of an exemplary enterprise.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removably affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

FIG. 1 illustrates a high-level overview of the relationships between an ERP system 102, an MES system 104, and production areas $106_1$-$106_N$ of an exemplary enterprise. In accordance with ISA-95 definitions, these entities are depicted as residing, respectively, on a Business Planning and Logistics level (Level 4), a Manufacturing Operations Management level (Level 3), and a Control level (levels 0-2). ERP system 102 can be used to integrate and collectively manage high-level business operations, such as finance, sales, order management, marketing, human resources, or other such business functions. ERP system 102 can serve as a high-level business planning tool that, stated broadly, is directed to longer-term business decision-making relative to operations at the control level, which generally focus on substantially real-time production concerns.

One or more control systems 108-112 can operate within respective production areas $106_1$-$106_N$ at the control level. Exemplary types of control systems can include, but are not limited to, batch control systems $108_{1-N}$ (e.g., mixing systems), continuous control systems $110_{1-N}$ (e.g., PID control systems), or discrete control systems $112_{1-N}$. These control systems can include one or more industrial controllers that facilitate monitoring and control of their respective processes. The controllers exchange data with the field devices using native hardwired I/O or via a plant network such as Ethernet/IP. Data Highway Plus, ControlNet, Devicenet, or the like. A given controller typically receives any combination of digital or analog signals from the field devices indicating a current state of the devices and their associated processes (e.g., temperature, position, part presence or absence, fluid level, etc.), and executes a user-defined control program that performs automated decision-making for the controlled processes based on the received signals. The controller then outputs appropriate digital and/or analog control signaling to the field devices in accordance with the decisions made by the control program. These outputs can include device actuation signals, temperature or position control signals, operational commands to a machining or material handling robot, mixer control signals, motor control signals, and the like. The control program can comprise any conceivable type of code used to process input signals read into the controller and to control output signals generated by the controller, including but not limited to ladder logic, sequential function charts, function block diagrams, structured text, or other such platforms.

Manufacturing Execution System (MES) 104 can monitor and manage control operations on the control level given higher-level business considerations. An exemplary MES system can be provided with information relating one or more of scheduling, work order management and execution, business operating procedures, resource management, quality criteria, inventory management, and the like. Given this high-level business information, MES system 104 can monitor control systems 108, 110, and/or 112 and issue control management instructions designed to align operations at the control level with medium-term or long-term goals of the organization as a whole.

Production areas $106_1$-$106_N$ can represent different areas within a single plant, corresponding, for example, to different segments of a given manufacturing process, different products, etc. Alternatively or in addition, Production areas $106_1$-$106_N$ can represent facilities located at different geographical locations associated with a given enterprise. In such architectures, a central MES system 104 can monitor and manage multiple control systems at different geographically diverse facilities, providing coordination between the facilities in view of a common business objective.

Figure 2:
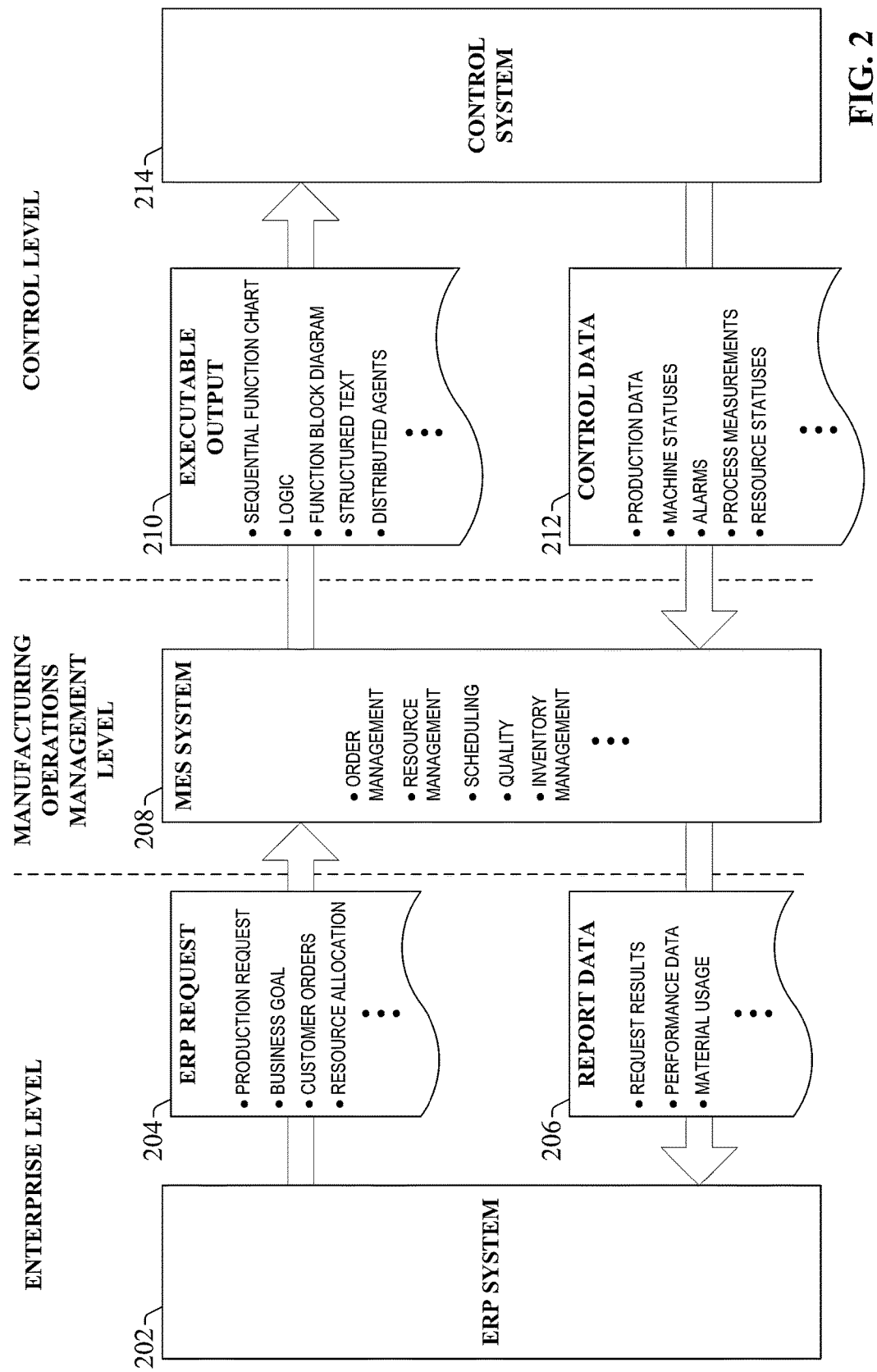
FIG. 2 is a block diagram of exemplary data flows between an ERP system, an MES system, and a control system.

One or more embodiments of the present innovation can include an MES system capable of receiving a request from an ERP system and mapping the request to one or more executable instructions for delivery to one or more control systems, thereby implementing the request on the plant floor in a manner deemed suitable by the MES system given its knowledge of the control system architecture, statuses, schedules, etc. FIG. 2 illustrates exemplary data flows between the ERP system, the MES system, and a control system according to one or more embodiments of the present disclosure. It is to be appreciated that control system 214 can comprise a single self-contained control system or multiple distributed control systems. Moreover, control system 214 can span multiple geographic locations, where individual control systems at the multiple locations report to a common MES system 208.

ERP system 202 (or a similar business system) can issue ERP requests 204 to MES system 208. Such requests can include, but are not limited to, production requests, business goals, customer order information, resource allocation requests, or other such requests. A production request can comprise, for example, a request from the ERP system to produce a specified quantity of a product. In such cases. ERP system 202 may not have knowledge of the particular control architecture or statuses of control system 214, machine availability, work schedules, or other plant floor variables involved in fulfilling the request. Given its ability to monitor and maintain these control-side factors, MES system can receive this production request from the ERP system 202 and determine one or more possible workflows for producing the desired amount of the indicated product based on an analysis of the overall control system architecture, machine availabilities, work schedules, or other plant floor variables involved in fulfilling the request. For example, the MES system can determine which machines are available and capable of producing the desired amount of the product, a suitable control strategy to be executed by the machines to satisfy the order (e.g., a batching sequence, a number of batches that must be run to produce the desired amount, etc.). The ERP can then transform a suitable workflow into an output executable by the control system to implement the workflow, using techniques to be described in more detail infra. Upon completion of (or during) the workflow, the MES system can provide the ERP system with report feedback at a desired level of granularity.

A business goal can comprise more a complicated request involving correlation of a plurality of factors. For example, the ERP system can issue a request to the MES system 208 to minimize energy consumption for the plant as a whole during a specified range of hours, while simultaneously maximizing production of an indicated product given the energy constraint. As with the production request, this request can be processed by MES system 208 and mapped to an appropriate control system workflow. Other exemplary ERP requests 204 can include customer order requests, resource allocation requests, or any other business request generated by ERP system 202.

As noted above, MES system 208 can map incoming ERP request 204 to a suitable workflow for execution by the MES system. In connection with generating this workflow, MES system can identify machines or devices that can be leveraged to fulfill the business request, as well as their associated controllers. MES system 208 can then translate the workflow to an executable output 210 capable of execution by the identified controllers. This executable output 210 can comprise any suitable format understandable by the controllers, including, without limitation, sequential function charts, ladder logic, function block diagrams, structured text, distributed control agents, and the like. Executable output 210 can also comprise control output signals mapped to tags or other I/O associated with the controllers.

In addition to providing workflow instructions, MES system 208 can monitor and receive control data 212 from control system 214. Examples of such control data include production data, machine statuses, alarms, process measurements (e.g., telemetry values), resource statuses, or other data made available by control system 214. Among other uses, MES system 208 can employ this control data to update system models used to select suitable workflows. MES system 208 can also employ the control data 212 to generate report data 206 for provision to ERP system 202. Report data 206 can include result data relating to implementation of the ERP request 204, presented at a desired level of granularity. For example, ERP system 202 may only require an indication that a production request specified by ERP request 204 was fulfilled, but does not require details regarding the particular equipment used or number of production cycles run in connection with completing the request. Accordingly, MES system 208 can be configured to omit such production details from report data 206.

It is to be appreciated that any suitable communication protocol can be used to affect the data exchanges described above. For example, ERP requests can be received by the MES system 208 in Business to Manufacturing Markup Language (b2MML), which is an XML implementation of the ANSI/ISA 95 family of standards. However, other suitable communication formats and protocols are also contemplated and are within the scope of the present disclosure.

The foregoing is intended to provide a general overview of the relationships and types of data exchange between the ERP system, MES system, and control system according to one or more embodiments of the present disclosure. As noted above, MES system 208 can receive an ERP request and map this request to a workflow deemed suitable for fulfilling the request. In one or more embodiments, this is achieved in part through the use of activity sets configured and stored on the MES system. An activity set defines a series of activities or a workflow for achieving a particular business goal (e.g., fulfilling a customer order, minimizing plant energy consumption during indicated hours, etc.). The activity set can define the activities in terms of both control and business functions to be performed, the order of operation for the steps, the designated machines or devices required to perform each step, or any other information required to fully define the control activity represented by the activity set. The scope of a given activity set can be limited to a single device, or can encompass multiple machines on both the business level and the control level coordinated by the MES system to perform a distributed operation in response to a received business request.

The workflow defined by an activity set can encompass both control-level activities and higher business-level activities acting in conjunction, thereby coordinating all levels of the enterprise to the end of satisfying the defined business goal. To this end, in addition to control operations, the activity sets can define interactions to be performed between the MES system and the ERP system relative to the defined sequence of control instructions. For example, it may be desired to provide validation feedback to the ERP system when a particular step of the control sequence associated with the activity set has been completed, or to provide an error message to the ERP system if a particular step of the control sequence fails or times out. Such feedback steps can be encoded in the activity set together with the control sequence activities. As will be discussed in more detail below, the MES system of the present disclosure can include a library of generalized industry-specific activity sets, which can be bound to a user's particular control context via controller tag mapping during initial configuration. The MES system also provides mechanisms allowing new custom activity sets to be created using an intuitive graphical interface that allows activity sets to be built from a library of control-level and business-level functional elements.

Moreover, according to one or more embodiments, activity sets can embody both controller instructions as well as visualization information that can be leveraged by a human-machine interface (HMI) to visualize the control process executed by the activity set. For example, an activity set representing a syrup mixing operation can comprise both the control sequence to be deployed to a controller to implement the sequence, as well as graphical instructions that can be deployed to an HMI to graphically render the process. Such an activity set can be preconfigured to coordinate the necessary data exchanges between the controller and the HMI to facilitate rendering the process on an HMI screen (e.g., linking the appropriate controller tags to corresponding HMI tags). The activity sets can also be preconfigured with business-side reporting instructions that facilitate delivery of report data to a business-level computer in connection with execution of the workflow. Since the workflows defined herein can be provided as industry-specific activity sets, the reporting data provided by a given activity set can be preconfigured to align with the reporting standards dictated by the particular industry with which the activity set is associated. For example, if the aforementioned syrup mixing activity set is designed for use in the Food and Beverage, report data generated and distributed by the activity set can conform to 21 CFR Part 11 standards electronic record-keeping and signature tracking.

Figure 3:
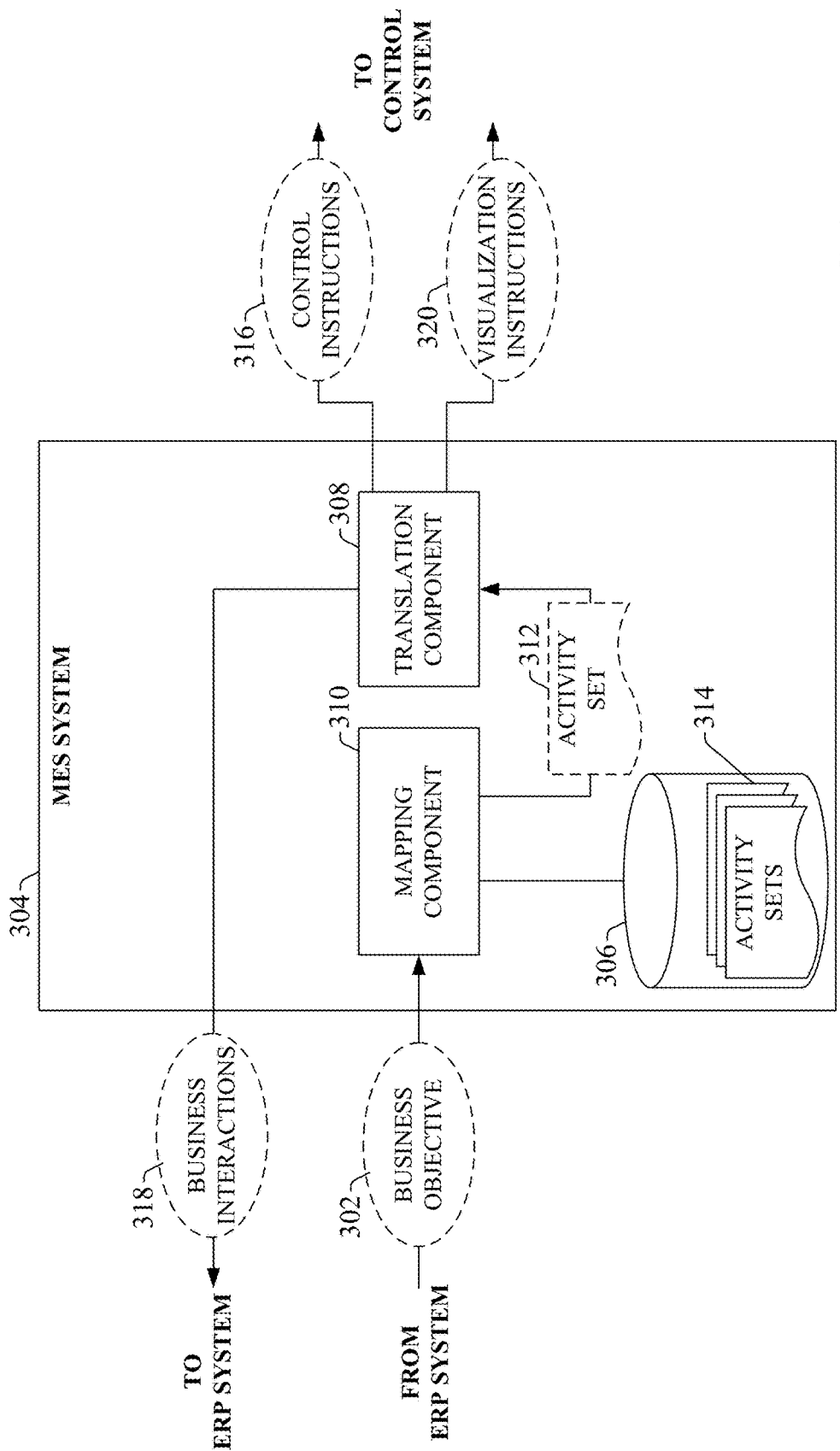
FIG. 3 is a block diagram of an MES system that maps a received ERP message to an activity set.

FIG. 3 provides a general overview of how an activity set is mapping and executed in response to a received ERP message. Business objective 302 can be received at the MES system 304. This business objective can be received, for example, from an ERP system such as ERP system 202 in FIG. 2. Business objective 302 can be encoded as a b2MML message generated by the ERP system, although other data formats are within the scope of the present disclosure. The business objective 302 can represent, for example, a request from the ERP system for a specified amount of an indicated product to be produced, a customer order to be filled, a business-driven constraint on plant operation (e.g., a request to minimize overall plant energy usage at specified peak hours of the week while maximizing output of a preferred product), or other such business-level objectives requiring altered operation at the control level.

The business objective is passed to a mapping component 310 of the MES system. Based on criteria to be described in more detail infra, the mapping component analyzes the business objective to determine a suitable activity set for achieving the specified business objective 302. Mapping component 310 then accesses a library of activity sets 314 stored in an activity set database 306, and identifies a suitable activity set 312 from activity sets 314. The selected activity set 312 is passed to a translation component 308 for translation into a set of control instructions 316 for deployment to appropriate controllers or devices of the control system. Translation component 308 can translate the selected activity set 312 to a set of control instructions 316 compatible with the target controller(s) (e.g., sequential function chart, ladder logic, structured text, function block code, etc.), which can then be deployed to the appropriate controllers or devices. Additionally or alternatively, control instructions 316 can comprise analog, digital, or networked control outputs directed to the appropriate controllers to facilitate initiation of control sequences already stored on the controllers.

The activity set 312 can also include a predefined visualization configuration for rendering the control sequence on an HMI or other visualization application. Accordingly, translation component 308 can translate this visualization configuration and deploy corresponding visualization instructions 320 to the control system. Such instructions can include such information as a graphical format in which the sequence data is to be rendered, controller tags or data points from which to receive the data to be rendered, or other such information that can be leveraged by an HMI to display the control sequence in an intuitive manner. In one or more embodiments, controller data to be visualized can be collected by the MES system 304 and routed to the HMI in accordance with the activity set configuration. Alternatively, the translation component 308 can provide the relevant controller tag definitions to the HMI and allow the HMI to establish the link directly to the identified tag. It is also considered that the visualization instructions 320 can be executed on the MES system 304 itself to facilitate visualization of the control process in accordance with the activity set 312.

In addition to the control and visualization functions, the activity set can also include sequence steps defining interactions between the MES system 304 and the ERP system relative to the control sequence. Such steps can include business-level reporting, verification requests directed to business personnel, or access to a business-level database or other system. For example, the activity set can define an ERP reporting step to be triggered in response to completion, failure, or timeout of a particular control-level operation. In another example, performance of a control-side operation may be dependent upon a business variable stored in a database on the business level of the enterprise (e.g., a current energy cost, a current price of materials, a current customer demand, etc.). In such an instance, the activity set may define that the MES system should read this business variable prior to execution of the control-side operation, and make execution of the control-side operation contingent on this value. Accordingly, the translation component 308 can translate such business-related operations defined in the activity set into appropriate business interactions 318.

Figure 4:
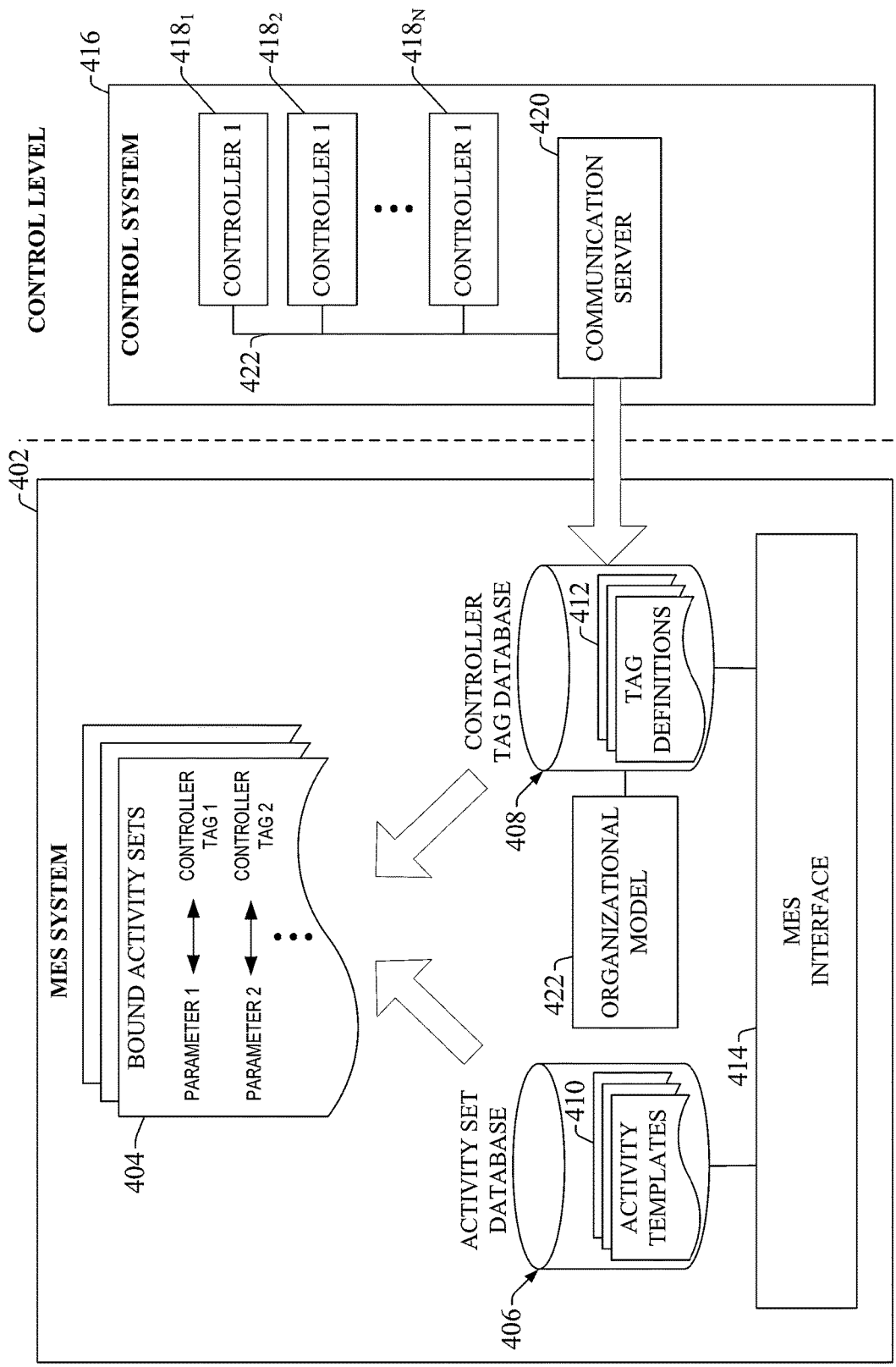
FIG. 4 illustrates binding of activity sets to an organization's control system.

The MES system of the present disclosure can provide generalized activity sets that can be adapted for use with an end user's control system prior to or during runtime. FIG. 4 illustrates binding of activity sets to an organization's control system. MES system 402 can include an activity set database 406 that stores a library of activity templates 410. Each activity templates 410 can include a set of control and/or business operations to be performed, parameters and any necessary conditionals associated with the respective operations, or any other information necessary to describe the operations represented by the activity template.

Before an activity set can be called by the MES system in response to an ERP request, the activity set must be bound to the control context of the user's control system 416. This can be achieved by associating the parameters of the activity set with selected controller tags. To this end, one or more embodiments of MES system 402 can include a controller tag database 408 that maintains a set of tag definitions 412 corresponding to controller tags resident on control system 416 (e.g., the tags of controllers 418). In one or more embodiments, MES system 402 can access the available controller tags via a communication server 420, which can be an OPC (OLE for Processing Control) server used to facilitate data exchange between controllers 418 and other devices.

It is also contemplated that features facilitating more direct and automated tag discovery features can be enabled within MES system 402 in response to certain conditions. For example, MES system 402 can determine whether one or more of the controllers 418 utilize a particular data type (e.g., a user-defined type or UDT) compatible with enhanced features available in MES system 402. In one or more embodiments, the particular data type that unlocks enhanced operation between the MES system 402 and the controller (e.g., simplified data exchanges) can be associated with a particular equipment vendor. MES system 402 can perform this check using any suitable technique, such as by polling the controller to determine if the controller supports the enhanced data type, reading a vendor identifier encoded in the controller's firmware, detecting a software configuration unique to the vendor, or other techniques. If the MES determines that the controller supports the enhanced data type, or is a product of the particular vendor, the MES system can enable an enhanced operating mode that provides additional configuration and runtime features not available when interacting with controllers that do not support the particular data type or that are made by a different vendor.

With particular regard to tag discovery, the enhanced operating mode can, for example, allow a common namespace for data points to be shared between the MES system and controllers 418 by virtue of the commonly supported data type. The common name space can allow a data tag to be defined at a single location (e.g., at the controller or in the MES system), and shared between the two systems through the common namespace. The enhanced operation mode can further allow data to be exchanged between the MES system and the controller under a common user-defined data type (UDT) not available when the MES system is not operating in the enhanced operating mode. Furthermore, the enhanced operation mode can enable additional data security measures not available when the MES is not operating in the enhanced operating mode.

To facilitate tag location, the tag definitions 412 can be associated with an organizational model 422 defined on MES system 402. Organizational model 422 can be, for example, a hierarchical representation of the organization and associated plant contexts. Organizational model 422 can be based on the S88 or S95 model, although any suitable modeling standard is contemplated. The organizational model 422 can represent the organization in terms of hierarchical physical locations, organizational levels, plant areas, devices, or any other suitable contexts. The hierarchical levels defined in the model can include, but are not limited to, an enterprise level, site level, area level, line level, and/or workcell level. By modeling locations of the controller tags within the hierarchical organizational model, MES system 402 can locate controller tags using relative paths that define the tags in terms of their locations and context within the hierarchy. In one or more embodiments, the use of the organizational model to locate tags using relative path names is only enabled when the MES system is operating in the enhanced operating mode (e.g., when the vendor of the controller matches the vendor of the MES system).

MES system 402 includes an interface 414 that facilitates user interaction with activity set database 406 and controller tag database 408. Interface 414 can comprise any suitable graphical interface capable of receiving user commands as input and rendering output to the user. Through the MES interface 414, a user can select an activity template to be configured from activity set database 406, and associate parameters defined within the selected activity set with corresponding controller tags defined in the controller tag database 408. Binding the parameters of the activity template with selected controller tags yields a bound activity set 404, which can be stored and subsequently matched to an incoming ERP request by the MES system 402.

Figure 5:
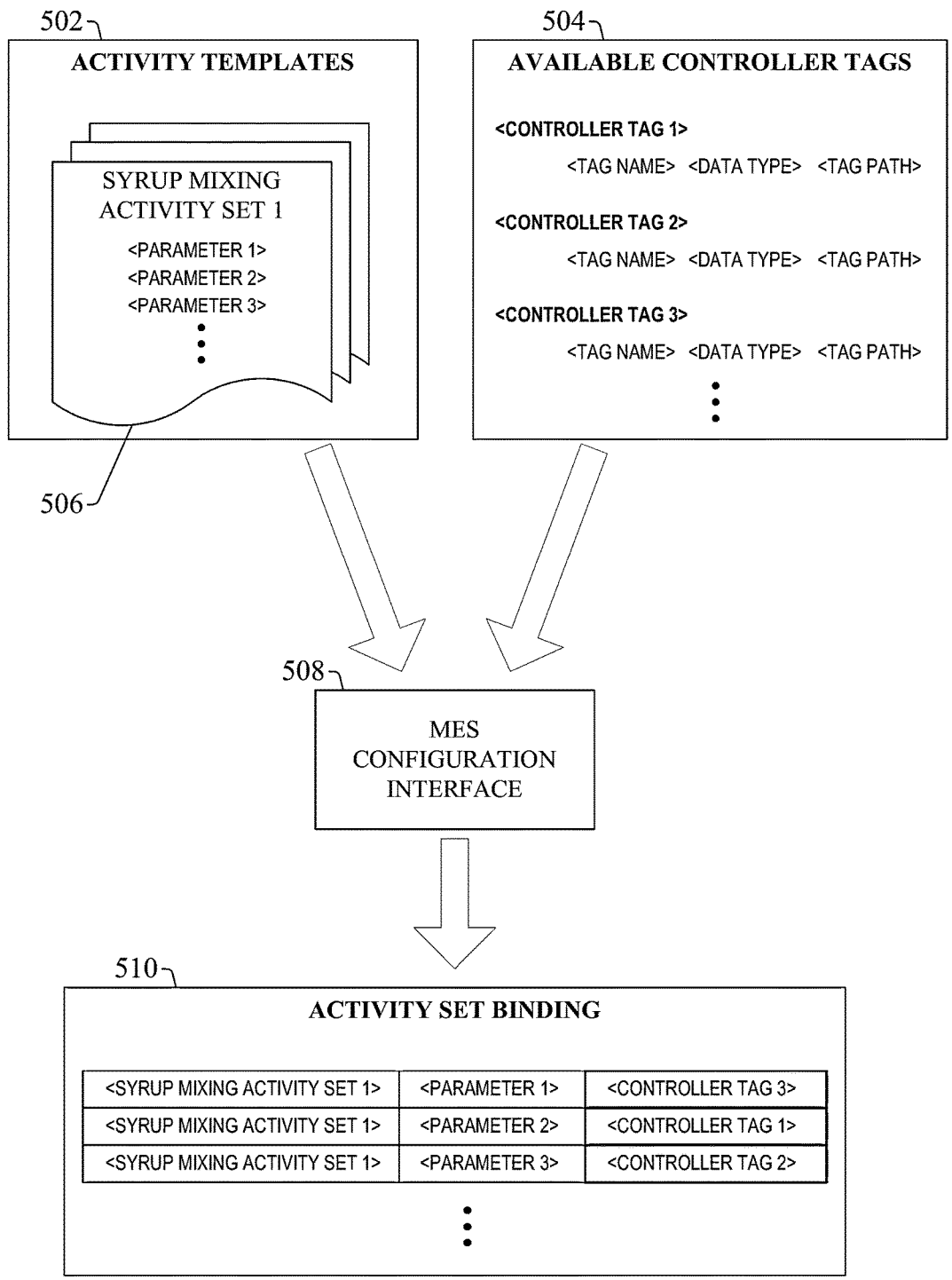
FIG. 5 illustrates an exemplary activity set binding.

FIG. 5 illustrates an exemplary activity set binding. In this example, a library of available activity templates 502 can include a generalized activity set 506 representing a syrup mixing sequence. The syrup mixing activity set 506 comprises a number of parameters, which serve as placeholders for controller tags required for execution of the activities defined in the generalized activity set. Parameters defined in the activity set can represent such controller elements as product quantities, mixer level valves, temperature values, start triggers, and the like.

Definitions for available controller tags 504 can be stored on the MES system (for example, in the controller tag database 408 of FIG. 4). Available controller tags 504 can be defined in terms of tag name, data type, tag path, or other suitable information describing the tag. Available controller tags 504 can be rendered, via configuration interface 508, as a collective searchable list of available tags from any or all controllers comprising an enterprise. As noted above, the list of available controller tags 504 can be populated, for example, by accessing a communication server (such as communication server 420 of FIG. 4).

The MES system can allow a developer, through interface 508, to select the syrup mixing activity set 506, and to select tags from the available controller tags 504 for association with the parameters of the selected activity set 506. This results in the activity set binding 510, which can be viewed via the interface 508 as a series of rows, each representing a single parameter-tag binding. For example, a given row can include fields representing the selected activity set, a parameter defined by the activity set, and a controller tag selected for association with the parameter. As will be described in more detail below, the MES system can leverage these user-defined control bindings to translate activity sets to actionable outputs executable by the controllers.

Figure 6:
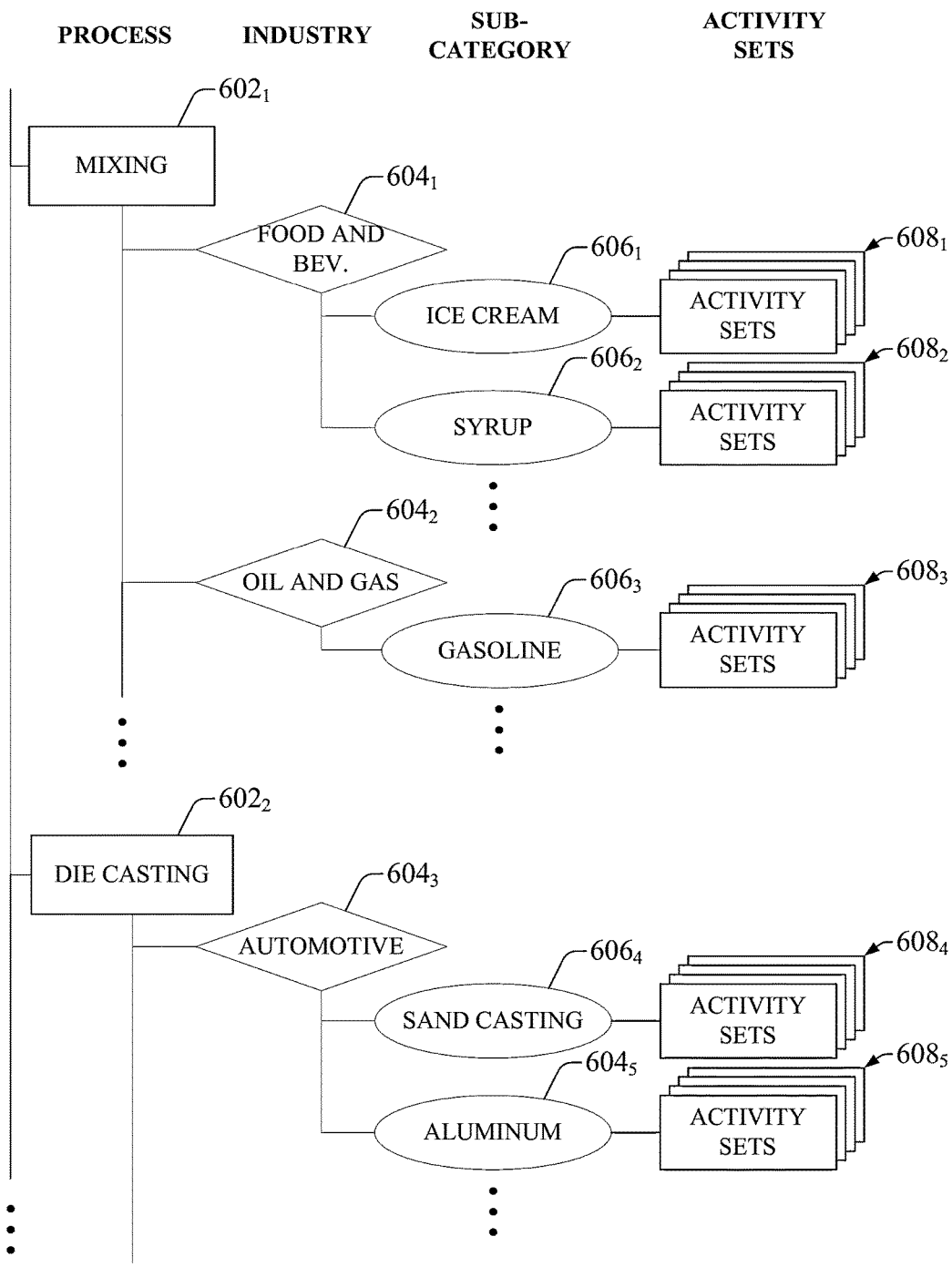
FIG. 6 illustrates an exemplary classification of activity sets according to categories and sub-categories.

To facilitate simplified location of a desired activity template, one or more embodiments of the MES system described herein can classify activity sets according to control function, industry, material, or any other suitable combination of hierarchical categories. FIG. 6 illustrates an exemplary organization of activity sets according to categories and sub-categories. In the exemplary architecture of FI. 6, activity sets 608 are organized according to the process performed by the activity set, the industry in which the activity set is applicable, and any appropriate subcategories. For example, there may be multiple stored activity sets for performing a mixing process, as represented by activity sets 608$_{1-3}$ under the MIXING category 602$_1$. Since some industries may require their manufacturing processes to conform with defined standards particular to the respective industries, activity sets under the MIXING category 602$_1$ may be further categorized according to industry (categories 604$_{1-2}$). For example, the food and beverage industry may be bound by a different set of standards for mixing than the oil and gas industry. Accordingly, MIXING activity sets are further classified under FOOD AND BEVERAGE 601$_1$ and OIL AND GAS 604$_2$, which branch hierarchically from the MIXING category 602$_1$. By segregating industry-specific activity sets according to industry, the respective activity sets can be encoded with appropriate industry rules and standards for process control, visualization, and reporting that govern the respective industries. For example, the reporting configuration defined in a mixing activity set intended for use in the plastics industry may be less granular than the reporting configuration for a similar mixing activity set intended for use in the food and beverage industry, which is governed by the record-keeping and signature requirements of 21 CFR Part 11.

Under each INDUSTRY category 604, MIXING activity sets 608$_{1-3}$ can be further classified according to any desired set of sub-categories. In this example, MIXING activity sets for FOOD AND BEVERAGE can be further classified according to the material being mixed, such as ICE CREAM 6061 or SYRUP 606$_2$. A similar classification structure for DIE CASTING activity sets 608$_{4-5}$ is also depicted in FIG. 6. In this way, activity sets 608 stored in the MES system can not only define industrial control functions, but can also encode within the functions any necessary standards associated with the particular industry, as well as control variations tailored to a given material or other process subcategory. Such classifications of predefined activity sets can also allow workflows to be defined within the MES system without the need for low-level programming. Given the classification structure depicted in FIG. 6, one or more embodiments of the MES system described herein can allow a user to quickly locate a suitable activity set during configuration and to customize the selected activity set for use with the user's particular control system through tag binding.

Figure 7:
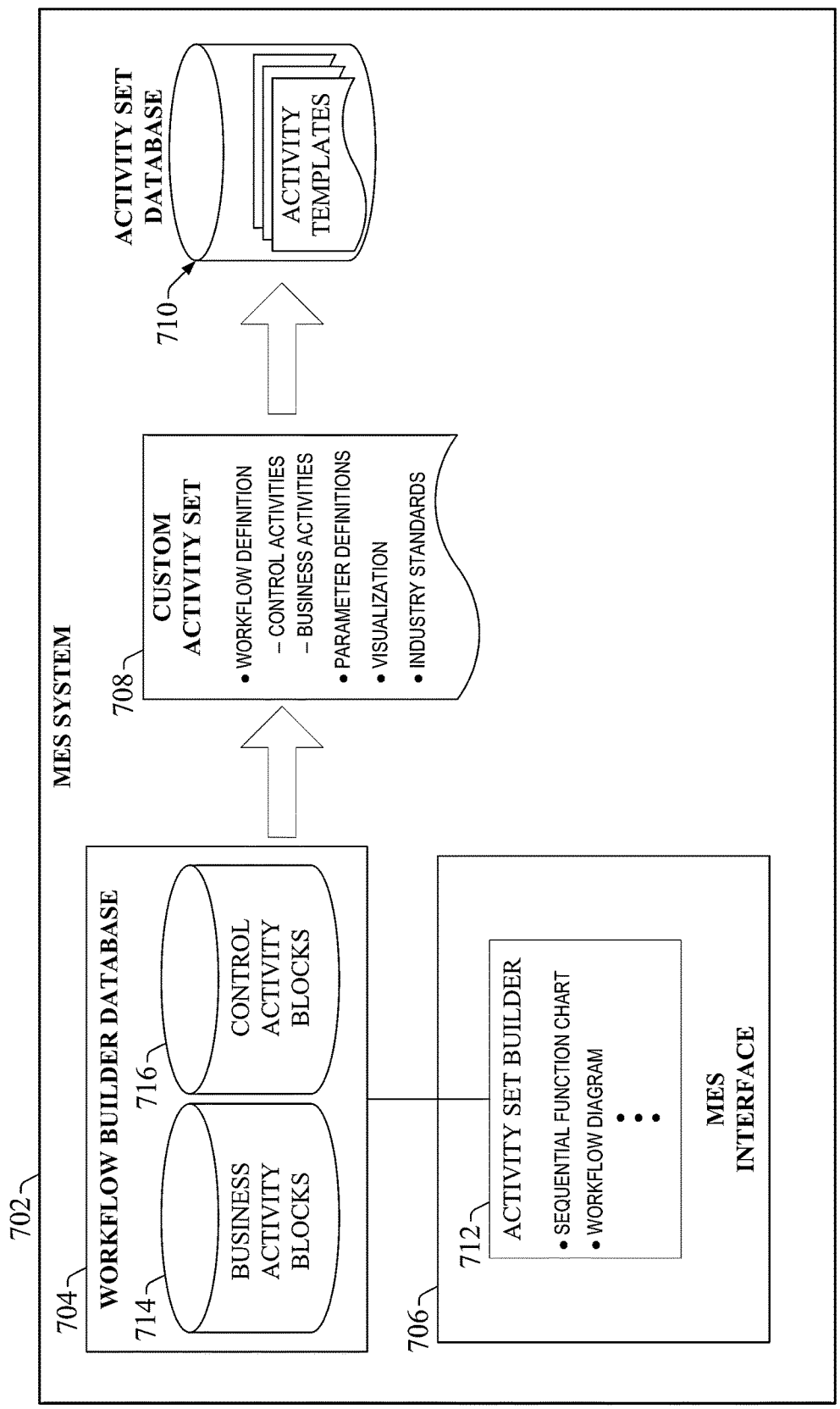
FIG. 7 illustrates creation of a custom activity set from functional elements in a workflow builder database.

Although the foregoing examples have presumed predefined classes of industry-specific activity sets which can be selectively bound to the controller tags of the user's control system, one or more embodiments of the MES system described herein can also include the capability to build custom activity sets for storage in the activity set database. FIG. 7 illustrates creation of such custom activity sets. MES system 702 can include an activity set builder 712, accessible via the MES interface 706. Activity set builder 712 can provide access to a workflow builder database 704, which includes preconfigured base components that can be used to construct an activity set. These base components can include both control-related blocks 716 and business-related blocks 714, so that activity sets can be built relating process control steps with business-side reporting, approval, record-keeping, and/or data retrieval steps according to developer preferences. Base components stored in the activity builder database can include functional components (e.g., function blocks) representing units of control- or business-related functionality, such as control sequences, equipment operations, reporting, data retrieval, error handling, approvals, sign-offs, or other such functionality. The base components can also include operators and/or sequence flow connectors for linking the functional components in a desired operational sequence and relationship. Activity set builder 712 can allow workflows to be constructed from the base components in a graphical drag-and-drop manner, thereby facilitating intuitive configuration of MES interactions with the business-level ERP system and the control-level systems without requiring low-level programming to be written. Any necessary parameters for subsequent binding to controller tags can also be defined and associated with selected workflow steps of the activity set. The resulting custom activity set 708 can then be saved to the activity set database 710 for subsequent user selection and controller tag binding (as described above in connection with FIGS. 4 and 5). After a custom activity set 708 has been created by a developer. MES interface 706 can allow the developer to classify the new activity set at a selected location within the activity set classification hierarchy (e.g., the hierarchy exemplified in FIG. 6), or to create a new classification within the storage hierarchy for storage of the new activity set.

Figure 8:
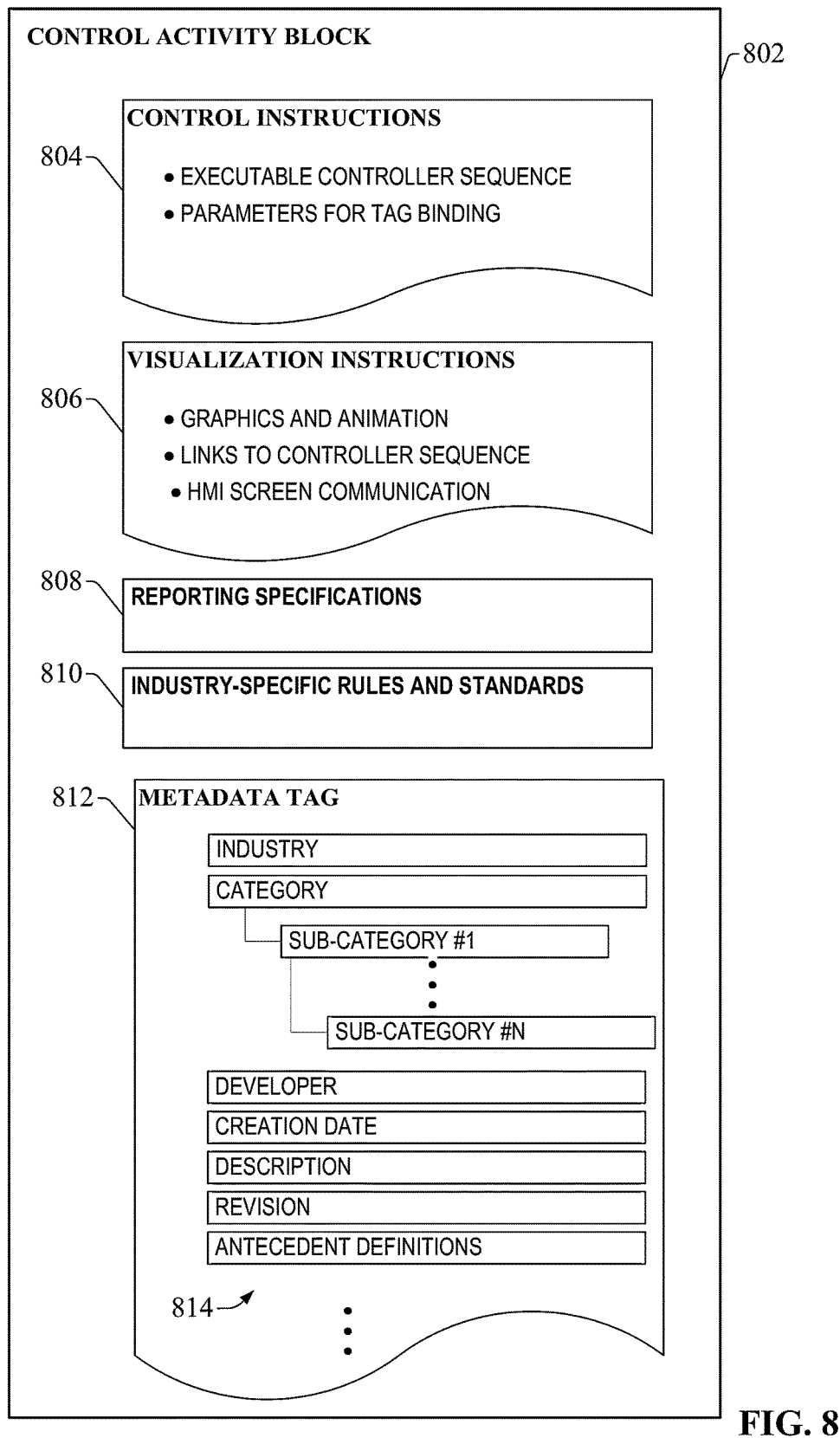
FIG. 8 illustrates an exemplary control activity block.

It is to be appreciated that the control- and business-related activity blocks can be stored in the activity builder database according to a similar classification scheme as that described above in connection with FIG. 6 for storage of activity sets. In this way, the reusable workflow configuration blocks can be preconfigured with combined control, visualization, reporting, and business instructions that conform to the rules and standards of a particular industry. FIG. 8 illustrates an exemplary control activity block as maintained on the workflow builder database. Control activity block 802 can include the control instructions 804 and visualization instructions 806 necessary to perform the operation represented by the block. For example, if control activity block 802 represents an ice cream mixer sequence, control instructions 804 can comprise a suitable executable controller sequence for performing the operation and parameter definitions for binding the tags of one or more controllers to the sequence. In one or more embodiments, the controller sequence can be viewed or edited as a graphical workflow via MES interface 706 (e.g., as a sequential function chart). The ice cream mixer block can further include visualization instructions 806 defining graphics and animation for the control sequence and any necessary data links to the controller sequence to facilitate HMI screen communication.

The control activity block 802 can further include reporting specifications 808 that define how execution of the control activity is to be reported (e.g., to a business-level reporting system). The reporting specifications 808 can specify what data is to be reported, how data should be consolidated for reporting, a level of data granularity for reporting, or other such specifications. Configuration of the control instructions 804, visualization instructions 806, and reporting specifications 808 can be guided by industry-specific rules and standards 810 associated with the activity block 802, ensuring that conformance to appropriate standards is being maintained merely by selecting an activity block classified under the relevant industry.

The control activity block 802 can also include a metadata tag 812, which can comprise a number of data fields 814 that can be used by the MES system to store, locate, and retrieve the activity block. Exemplary metadata tag 812 can include, without limitation, the following data fields:

Industry: The industry or business in which activity block is intended to be used. Values for this field can correspond to core vertical industries, such "Food and Beverage," "Automotive," "Oil and Gas," Life Sciences," etc.

Category md sub-categories: Hierarchical classification tiers used to determine how the activity block is to be classified within an industry-based hierarchy of the workflow builder database. The categories and sub-categories can relate to the type of industrial process in which the block is applicable. Exemplary categories can include batch processing, material handling, motion control, vision, mixing, and die casting.

Developer, Creation Date, Description, Revision: Name of the individual or organization that created the activity block, date of creation, functional description, and revision number of the block.

Antecedent Definitions: Activity blocks that served as a basis for creation of the activity block. This field is applicable if the block is a modification or customization of a pre-existing block, and allows revision lineages to be tracked even if an activity block has been modified by multiple developers to suit different automation scenarios. Associated data fields can provide revision notes explaining the modifications.

By providing such comprehensive, industry-specific activity blocks, MES workflows can be built in a graphical manner using without requiring low-level programming expertise, thereby affording business-side managers and plant-side personnel with limited programming experience to develop meaningful MES workflows in an intuitive manner.

As discussed above, one or more embodiments of the MES system described herein can operate in an enhanced operating mode when communicating with a controller that supports a particular data type (e.g., a particular UDT) used by the MES system. This enhanced operating mode can improve and simplify data exchange between the MES system and the controller by virtue of the shared data type. In some embodiments, the common data type may be associated with a particular equipment vendor, such that use of the shared data type by both the MES system and the controller is indicative of a common equipment vendor. As noted above, the enhanced operating mode can facilitate such features as automated tag discovery and support for a common name space for data points shared between the MES system and the controller. In some embodiments, the shared data type can also unlock enhanced visualization aspects, such that the MES system becomes capable of rendering additional information made available by the shared data type and which is not available when the MES system is exchanging data with a controller that does not support the data type. In another example, the shared data type can allow a browsable interface to be enabled in the MES system that facilitates browsing of tags in the controller from the MES system. This concept of facilitating enhanced system operation in response to a determination that a particular specialized data type is supported by two communicatively coupled systems is not limited to operations between an MES system and an industrial controller, and is applicable to virtually any system involving data exchange between two system entities.

The unlocking of enhanced operational features based on a shared data type is discussed in more detail with reference to FIG. 9. Although these enhanced operation features are discussed in connection with an MES system and a controller, it is to be appreciated that the broader concept of enhanced operation by virtue of a shared data type can be applied to any system in which data is exchanged between two devices or system entities in which the devices or system entities can be provided by different equipment vendors or a common equipment vendor.

Figure 9:
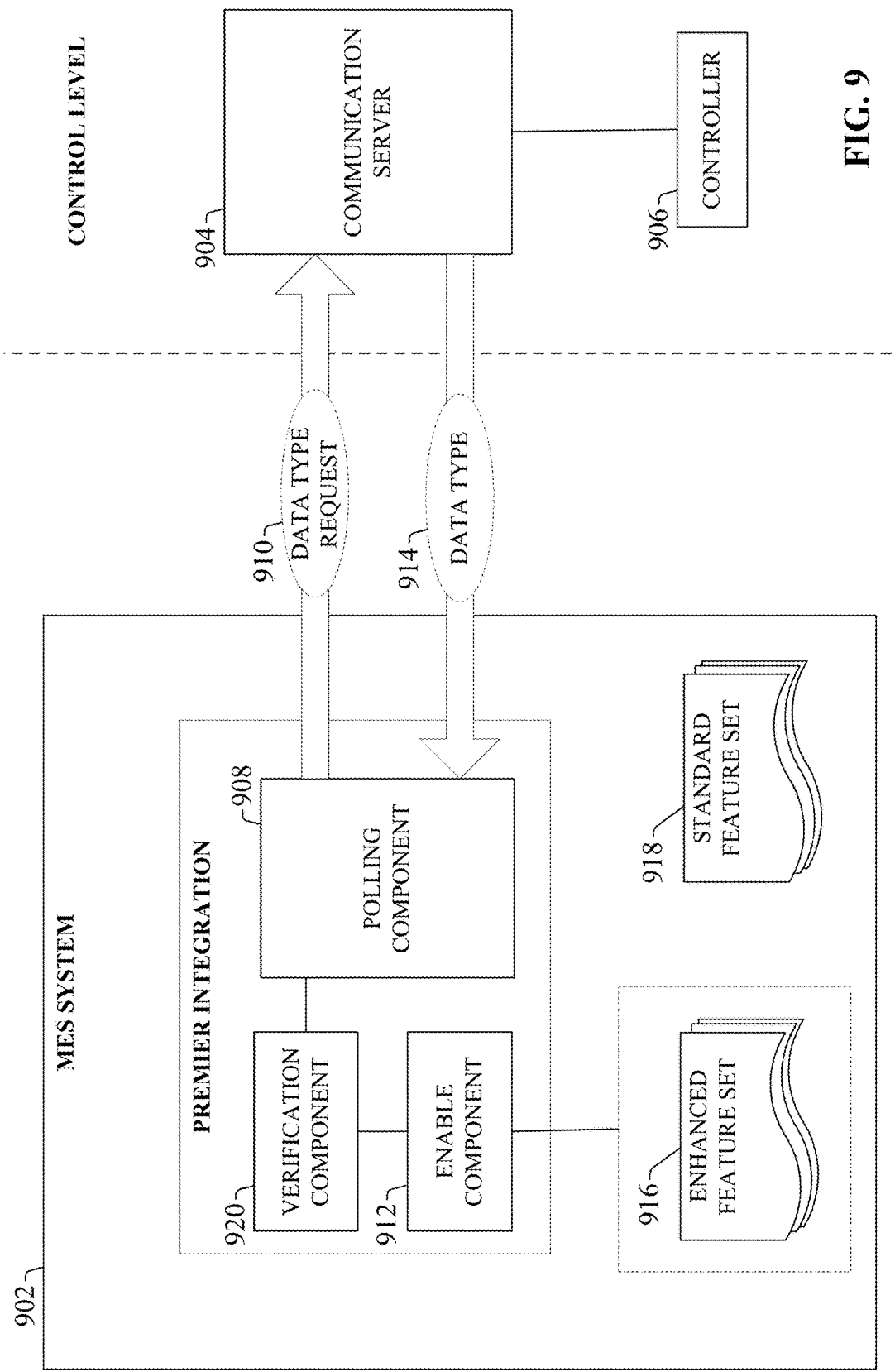
FIG. 9 is a block diagram depicting enablement of an enhanced feature set in the MES system based on data type compatibility with a controller.

FIG. 9 illustrates an exemplary MES system that exchanges data with a controller 906 via a communication server 904 (although configurations in which communication server 904 is omitted and MES system 902 communicates directly with controller 906 are also within the scope of this disclosure). MES system 902 is configured to select one of two operating states based on a determination of whether the contoller 906 supports a particular data type compatible with an enhanced feature set 916 available in the MES system 902. The data type may be, for example, a vendor-specific data type designed for compatibility with enhanced feature set 916. Accordingly, if MES system 902 determines that controller 906 supports the data type required by enhanced feature set 916, the system will operate in a first state in which the enhanced feature set 916 is enabled. Otherwise, if MES system 902 determines that controller 906 does not support the necessary data type (e.g., controller 906 is provided by a vendor that does not support the proprietary data type), MES system 902 will operate in a second state in which only the standard feature set 918 is enabled. This concept of enabling enhanced feature set 916 based on a shared proprietary data type is referred to herein as premier integration, and acts a an incentive to integrate products by a common vendor at multiple levels of an enterprise.

To facilitate premier integration, one or more embodiments of MES system 902 can include a polling component 908 that sends a data type request 910 to controller 906 (either directly or via communication server 904. Controller 906 can respond to the data type request 510 with a data type identifier 914 confirming that controller 906 supports the data type required by enhanced feature set 916. In some embodiments, controller 906 may not respond to data type request 910 if the controller does not support the required data type, since the data type request 910 may not be interpretable by controllers provided by other vendors.

In response to receiving data type identifier 914, a verification component 920 can verify the data type identifier 914. Upon successful verification by verification component 920, an enable component 912 can enable the enhanced feature set 916, allowing the user to make use of the enhanced features.

Figure 10:
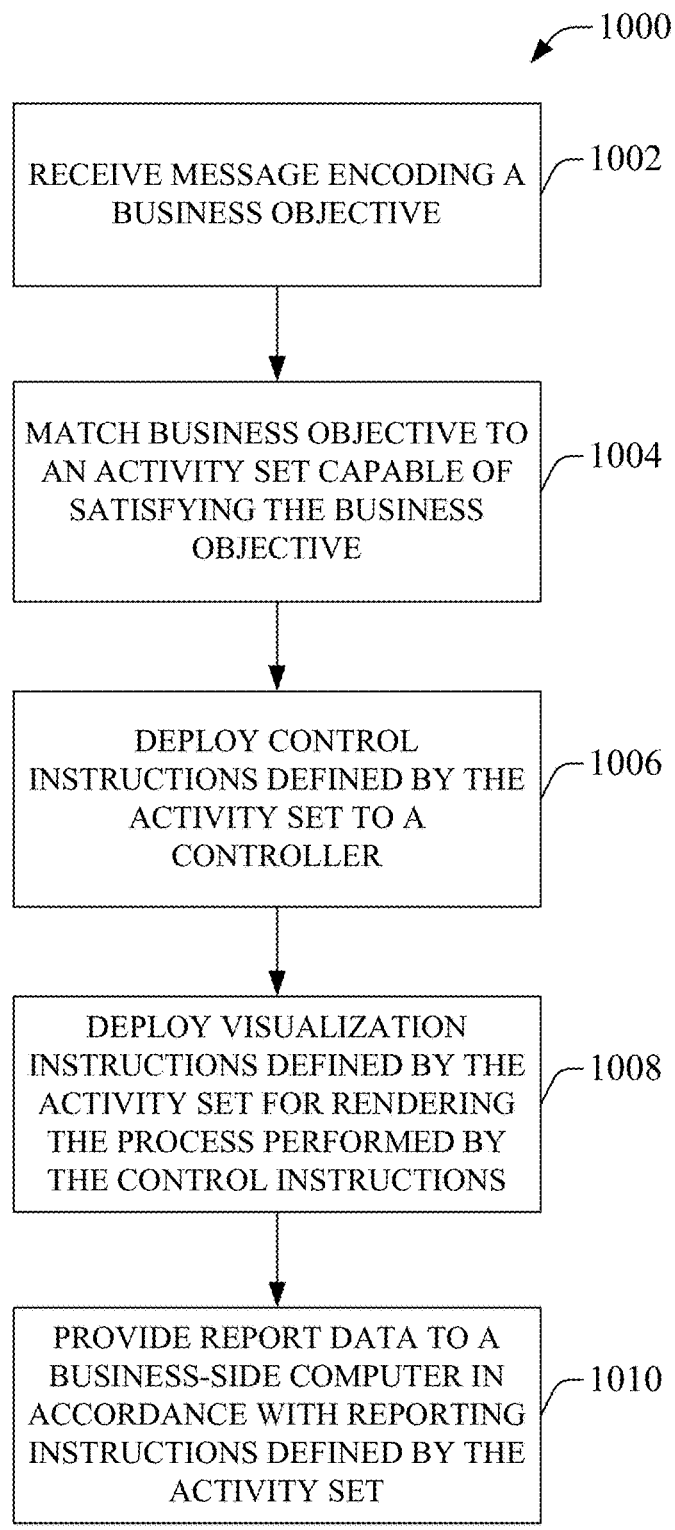
FIG. 10 is a flowchart of an example methodology for leveraging an activity set to facilitate completion of a business objective.
Figure 11:
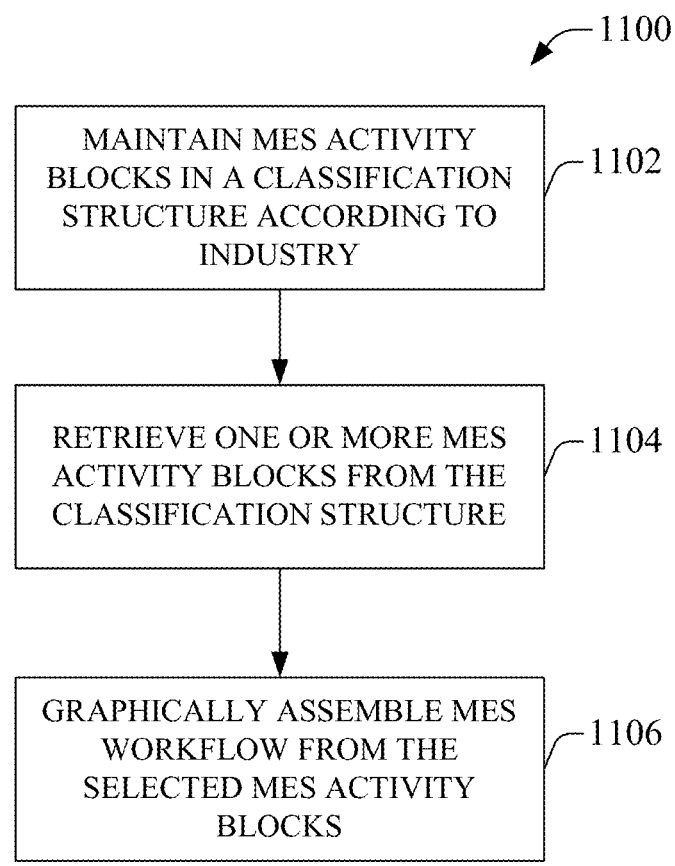
FIG. 11 is a flowchart of an example methodology for utilizing industry-specific activity blocks to graphically assemble an MES workflow.
Figure 12:
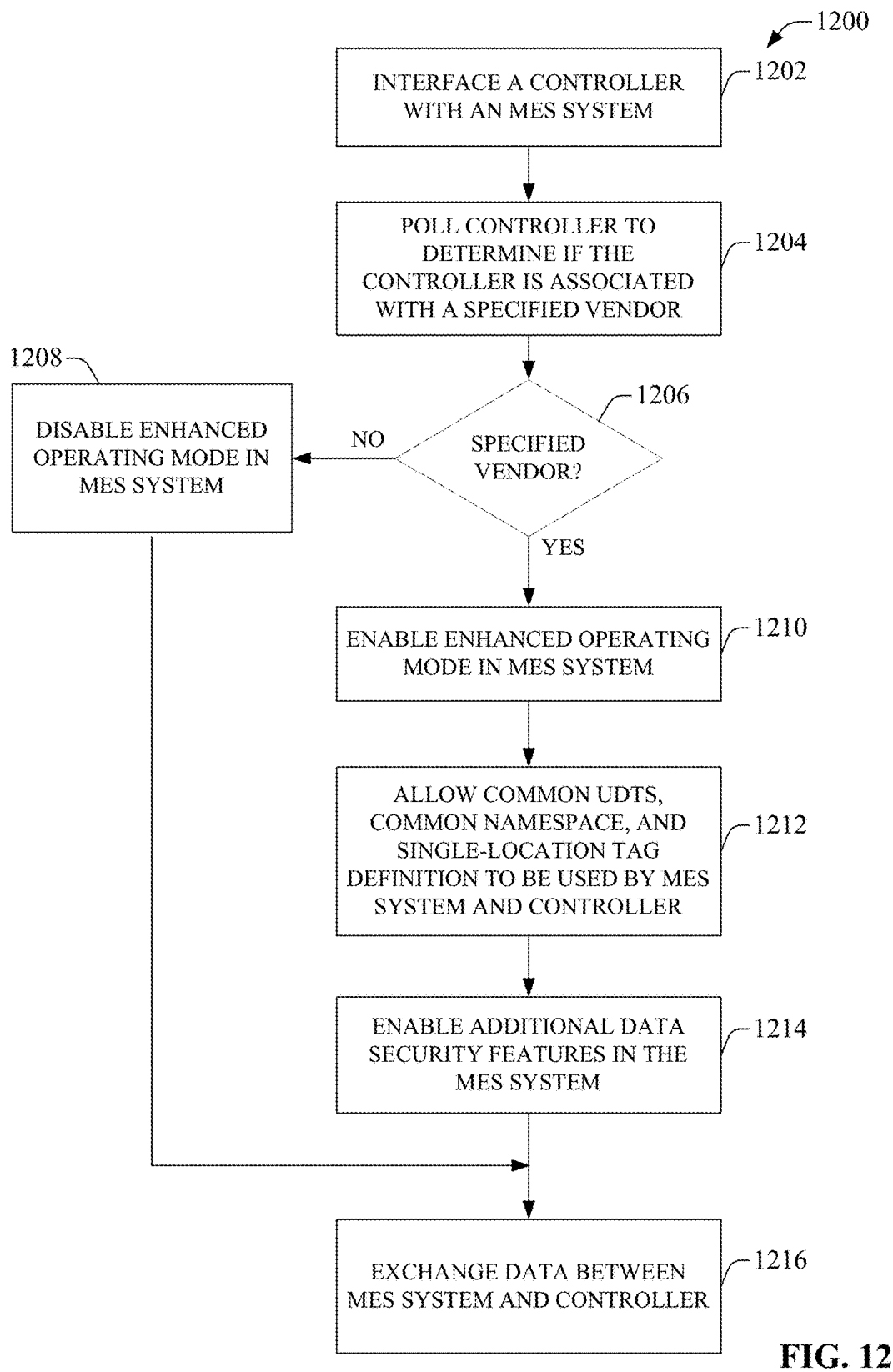
FIG. 12 is a flowchart of an example methodology for enabling an enhanced operating mode in an MES system based on a vendor of a controller communicatively coupled to the MES system.

FIGS. 10-12 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

FIG. 10 illustrates an example methodology 1000 for leveraging an activity set to facilitate completion of a business objective. At 1002, a message having a business objective encoded therein is received. In one or more embodiments, the message can be received from an ERP system as a b2MML data structure, although other types of business systems and message formats are contemplated. The business objective can represent a goal or instruction generated by the ERP system and driven by business-level considerations. Exemplary business objectives can include fulfillment of a customer order, performance of a product quality check, a request to maintain overall energy consumption for the plant below a specified maximum during indicated hours of the week, a request to give priority to production of a specified product when allocating materials or resources, or other such business-driven objectives. If the message is to be processed by an MES system, the message can be received directly by the MES system, or by an ERP gateway that manages message exchanges between the business-level system and the MES system.

At 1004, the MES system identifies a stored activity set capable of satisfying the business objective encoded in the message, and associates the message with the identified activity set. The activity set can define a workflow comprising one or both of control-level operations and business-level operations to be performed in a defined sequence under the coordination of the MES system. Upon receipt of the message from the ERP system, the MES system can access a library of such activity sets and select an activity set capable of satisfying the business objective.

At 1006, the MES system deploys control instructions defined by the activity set to one or more controllers. This can comprise converting the control-side workflow operations defined in the activity set into control instructions executable by the controllers or devices involved in the workflow. These instructions can then be deployed to the controllers by the MES system. The instructions can comprise any conceivable type of code used to process input signals read into the controller and to control output signals generated by the controller, including but not limited to ladder logic, sequential function charts, function block diagrams, structured text, or other such platforms. The instructions can also take the form of output signals generated by the MES system for triggering sequences already stored on the controllers. These interactions between the MES system and controllers can be implemented using preconfigured bindings between controller tags and parameters of the activity set.

At 1008, the MES system deploys visualization instructions defined by the activity set for graphically rendering the process performed by the controller instructions. For example, the activity set can define a graphical view of the process and coordinate the necessary data exchanges between the controller and an HMI to facilitate rendering the process on an HMI screen (e.g., linking the appropriate controller tags to corresponding HMI tags).

At 1010, the MES system provides report data to a business-side computer (e.g., to the ERP system or another business system) in accordance with reporting instructions defined by the activity set. The report data can relate to the control process performed by the control instructions, and can conform to a particular industrial standard for reporting or record-keeping defined by the activity set by virtue of its class.

FIG. 11 illustrates an example methodology 1100 for utilizing industry-specific activity blocks to graphically assemble an MES workflow. At 1102, MES activity blocks are maintained in a classification structure according to industry. The stored activity blocks can represent units of control- or business-related functionality, such as control sequences, equipment operations, reporting, data retrieval, error handling, approvals, sign-offs, or other such functionality. The functionality defined by the blocks can be preconfigured to conform to any appropriate industry standards associated with the respective industry classifications.

At 1104, one or more activity blocks are retrieved from the classification structure. At 1106, the selected activity blocks are graphically assembled to yield an MES workflow that can be subsequently matched to incoming ERP requests for execution of business objectives. In one or more embodiments, the workflow can be graphically assembled via drag-and-drop manipulation of the blocks. The resulting workflow can encompass both control-side and business-side operations in accordance with the graphically assembled activity blocks, allowing coordination between both levels to be configured without extensive programming.

FIG. 12 illustrates an example methodology 1200 for enabling an enhanced operating mode in an MES system based on a vendor of a controller communicatively coupled to the MES system. At 1202, a controller is interfaced with an MES system. At 1204, the MES system polls the controller to determine if the controller is associated with a specified vendor. At 1206, if the controller is not associated with the specified vendor, enhanced operating mode is disabled in the MES system at 1208. If the controller is associated with the specified vendor, enhanced operating mode is enabled in the MES system at 1210. At 1212, the enhanced operating mode allows one or more common user-defined data types (UDTs), a common namespace, and single-location tag-definition to be used between the MES system and the controller. At 1214, the enhanced operating mode enables additional data security features in the MES system. At 1216, data is exchanged between the MES system and the controller.

Embodiments, systems, and components described herein, as well as industrial control systems and industrial automation environments in which various aspects set forth in the subject specification can be carried out, can include computer or network components such as servers, clients, programmable logic controllers (PLCs), communications modules, mobile computers, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC as used herein can include functionality that can be shared across multiple components, systems, and/or networks. As a example, one or more PLCs can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC can also communicate to and control various other devices such as I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including Device-Net, ControlNet, and Ethernet/IP. Other networks include Ethernet. DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability. LANs, WANs, proxies, gateways, routers, firewalls, virtual private network (VPN) devices, servers, clients, computers, configuration tools, monitoring tools, and/or other devices.

Figure 13:
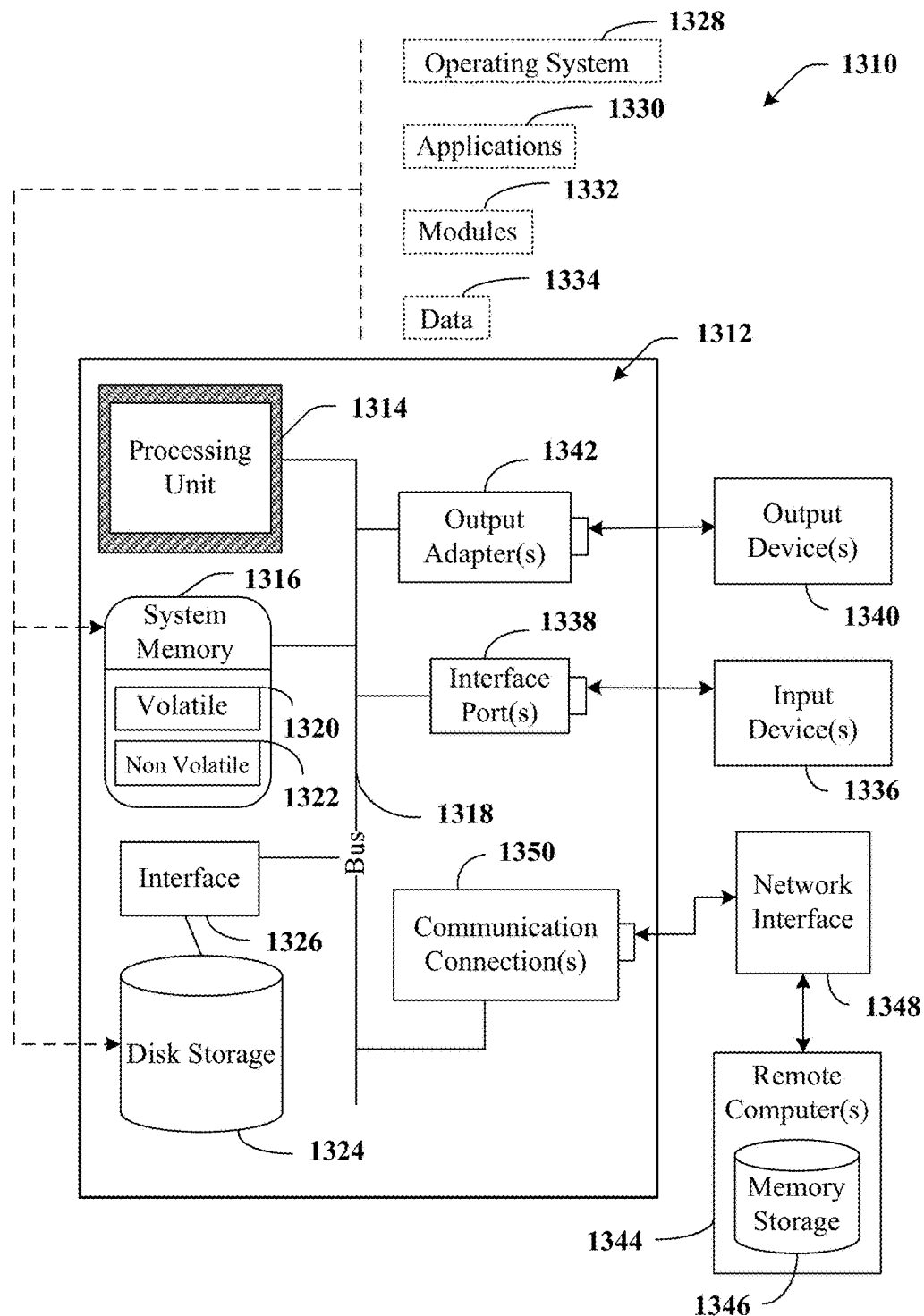
FIG. 13 is an example computing environment.

With reference to FIG. 13, an example operating environment 1310 for implementing various aspects of the aforementioned subject matter includes a computer 1312. The computer 1312 includes a processing unit 1314, a system memory 1316, and a system bus 1318. The system bus 1318 couples system components including, but not limited to, the system memory 1316 to the processing unit 1314. The processing unit 1314 can be any of various available processors. Dual microprocessors and other multiprocessor architectures also can be employed as the processing unit 1314.

The system bus 1318 can be any of several types of bus structure(s) including the memory bus or memory controller, a peripheral bus or external bus, and/or a local bus using any variety of available bus architectures including, but not limited to, 8-bit bus. Industrial Standard Architecture (ISA), Micro-Channel Architecture (MSA), Extended ISA (EISA). Intelligent Drive Electronics (IDE). VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1316 includes volatile memory 1320 and nonvolatile memory 1322. The basic input/output system (BIOS), containing the basic routines to transfer information between elements within the computer 1312, such as during start-up, is stored in nonvolatile memory 1322. By way of illustration, and not limitation, nonvolatile memory 1322 can include read only memory (ROM), programmable ROM (PROM), electrically programmable ROM (EPROM), electrically erasable PROM (EEPROM), or flash memory. Volatile memory 1320 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1312 also includes removable/non-removable, volatile/nonvolatile computer storage media. FIG. 13 illustrates, for example a disk storage 1324. Disk storage 1324 includes, but is not limited to, devices like a magnetic disk drive, floppy disk drive, tape drive. Jaz drive, Zip drive, LS-100 drive, flash memory card, or memory stick. In addition, disk storage 1324 can include storage media separately or in combination with other storage media including, but not limited to, an optical disk drive such as a compact disk ROM device (CD-ROM), CD recordable drive (CD-R Drive). CD rewritable drive (CD-RW Drive) or a digital versatile disk ROM drive (DVD-ROM). To facilitate connection of the disk storage 1324 to the system bus 1318, a removable or non-removable interface is typically used such as interface 1326.

It is to be appreciated that FIG. 13 describes software that acts as an intermediary between users and the basic computer resources described in example operating environment 1310. Such software includes an operating system 1328. Operating system 1328, which can be stored on disk storage 1324, acts to control and allocate resources of the computer

1312. System applications 1330 take advantage of the management of resources by operating system 1328 through program modules 1332 and program data 1334 stored either in system memory 1316 or on disk storage 1324. It is to be appreciated that one or more embodiments of the subject disclosure can be implemented with various operating systems or combinations of operating systems.

A user enters commands or information into the computer 1312 through input device(s) 1336. Input devices 1336 include, but are not limited to, a pointing device such as a mouse, trackball, stylus, touch pod, keyboard, microphone, joystick, game pad, satellite dish, scanner, TV tuner card, digital camera, digital video camera, web camera, and the like. These and other input devices connect to the processing unit 1314 through the system bus 1318 via interface port(s) 1338. Interface port(s) 1338 include, for example, a serial port, a parallel port, a game port, and a universal serial bus (USB). Output device(s) 1340 use some of the same type of ports as input device(s) 1336. Thus, for example, a USB port may be used to provide input to computer 1312, and to output information from computer 1312 to an output device 1340. Output adapter 1342 is provided to illustrate that there are some output devices 1340 like monitors, speakers, and printers, among other output devices 1340, which require special adapters. The output adapters 1342 include, by way of illustration and not limitation, video and sound cards that provide a means of connection between the output device 1340 and the system bus 1318. It should be noted that other devices and/or systems of devices provide both input and output capabilities such as remote computer(s) 1344.

Computer 1312 can operate in a networked environment using logical connections to one or more remote computers, such as remote computer(s) 1344. The remote computer(s) 1344 can be a personal computer, a server, a muter, a network PC, a workstation, a microprocessor based appliance, a peer device or other common network node and the like, and typically includes many or all of the elements described relative to computer 1312. For purposes of brevity, only a memory storage device 1346 is illustrated with remote computer(s) 1244. Remote computer(s) 1344 is logically connected to computer 1312 through a network interface 1348 and then physically connected via communication connection 1350. Network interface 1348 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1350 refers to the hardware/software employed to connect the network interface 1348 to the system bus 1318. While communication connection 1350 is shown for illustrative clarity inside computer 1312, it can also be external to computer 1312. The hardware/software necessary for connection to the network interface 1348 includes, for exemplary purposes only, internal and external technologies such as, modems including regular telephone grade modems, cable modems and DSL modems, ISDN adapters, and Ethernet cards.

Figure 14:
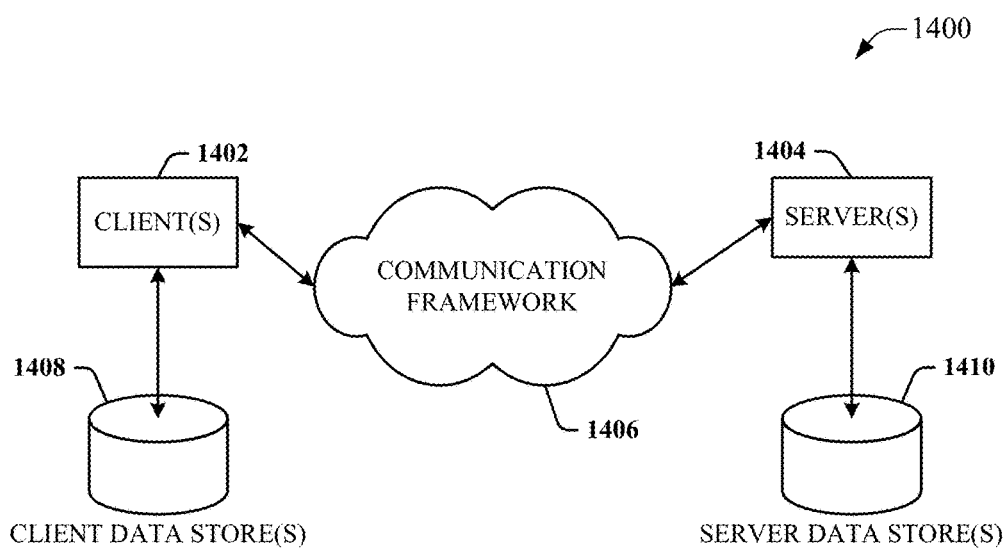
FIG. 14 is an example networking environment.

FIG. 14 is a schematic block diagram of a sample computing environment 1400 with which the disclosed subject matter can interact. The sample computing environment 1400 includes one or more client(s) 1410. The client(s) 1402 can be hardware and/or software (e.g., threads, processes, computing devices). The sample computing environment 1400 also includes one or more server(s) 1404. The server(s) 1404 can also be hardware and/or software (e.g., threads, processes, computing devices). The servers 1404 can house threads to perform transformations by employing one or more embodiments as described herein, for example. One possible communication between a client 1402 and a server 1404 can be in the form of a data packet adapted to be transmitted between two or more computer processes. The system 1400 includes a communication framework 1406 that can be employed to facilitate communications between the client(s) 1402 and the server(s) 1404. The client(s) 1402 are operably connected to one or more client data store(s) 1408 that can be employed to store information local to the client(s) 1402. Similarly, the server(s) 1404 are operably connected to one or more server data store(s) 1410 that can be employed to store information local to the servers 1404.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

The invention claimed is:

1. A manufacturing and execution system (MES) device, comprising:
a memory that stores executable components; and
a processor, operatively coupled to the memory, that executes the executable components, the executable components comprising:
a graphical interface configured to receive first input selecting a parameter of an activity template selected from a plurality of activity templates stored in a template database and defining generalized activity sets, and second input identifying a controller tag of an industrial controller to map to the parameter of the activity template to yield a bound activity set, wherein the graphical interface has a conditionally enabled interface that facilitates browsing of controller tags in the industrial controller in connection with generating the second input;
an activity set database configured to store the bound activity set as one of a plurality of activity sets, the plurality of activity sets defining respective workflows capable of execution by one or more manufacturing and execution systems (MES);
a verification component configured to determine whether the industrial controller supports a data type indicative of an equipment vendor that is common to the MES device and the industrial controller; and
an enable component configured to:
in response to a determination by the verification component that the industrial controller does not support the data type, prevent operation of the conditionally enabled interface, and
in response to a determination by the verification component that the industrial controller supports the data type, enable the operation of the conditionally enabled interface and allow a common namespace to be used by the MES device and the industrial controller to reference data points in the MES device and the industrial controller.

2. The MES device of claim 1, wherein the executable components further comprise a polling component configured to send request data to the industrial controller requesting confirmation information that indicates whether the industrial controller supports the data type.

3. The system MES device of claim 2, wherein the verification component is further configured to determine whether the industrial controller supports the data type based on a response to the request data received from the industrial controller.

4. The MES device of claim 1, wherein the plurality of activity sets respectively execute at least one of a business-level operation or a control-level operation to facilitate fulfillment of a defined business objective.

5. The system MES device of claim 4, wherein the MES device is further configured to translate a workflow defined by one of the plurality of activity sets into at least one control instruction and to deploy the at least one control instruction to the industrial controller.

6. The system of claim 1, wherein the enable component is further configured to, in response to the determination by the verification component that the industrial controller supports the data type, enable one or more security features in the MES device.

7. A method for selectively enabling features of a device, comprising:
receiving, by the MES device, first input selecting a parameter of an activity template selected from a plurality of activity templates representing respective generalized activity sets, and second input identifying a controller tag of an industrial controller to map to the parameter of the activity template to yield a bound activity set, wherein the receiving the second input comprises:
determining whether the industrial controller recognizes a data type associated with a specified equipment vendor,
enabling a conditionally enabled interface of the MES device in response to determining that the industrial controller recognizes the data type, wherein the conditionally enabled interface facilitates remote browsable searching of data tags located on the industrial controller from the MES device and enables referencing of data items on the MES device and the industrial controller using a common namespace, and
disabling the conditionally enabled interface of the device in response to determining that the industrial controller does not recognize the data type; and
storing, by the MES device, the bound activity set as one of a plurality of activity sets, the plurality of activity sets defining respective workflows capable of execution by one or more MES systems.

8. The method of claim 7, further comprising sending request data to the industrial controller requesting information indicative of whether the industrial controller recognizes the data type.

9. The method of claim 7, further comprising enabling one or more security features of the MES device in response to determining that the industrial controller recognizes the data type.

10. The method of claim 7, further comprising enabling, by the MES device, a feature that facilitates discovery of the data tags on the industrial controller by the MES device in response to determining that the industrial controller recognizes the data type.

11. The method of claim 7, further comprising executing, by the MES device, at least one of a business-level operation or a control-level operation defined by one of the plurality of activity sets to facilitate fulfillment of a defined business objective.

12. The method of claim 11, further comprising:
translating, by the MES device, a workflow defined by one of the activity sets into at least one control instruction; and
deploying, by the MES device, the at least one control instruction to the industrial controller.

13. The method of claim 11, further comprising:
translating, by the MES device, a workflow defined by one of the plurality of activity sets into at least one instruction for exchanging data with a business-level device; and
deploying, by the MES device, the at least one instruction to the business-level device.

14. The method of claim 11, wherein the translating comprises translating the one of the plurality of activity sets into at least one of a business-level reporting instruction, a verification request directed to an employee, or a request to access a business-level database.

15. A non-transitory computer-readable medium having stored thereon computer-executable components that, in response to execution, cause a manufacturing and execution system (MES) device comprising a processor to perform operations, the operations comprising:
   receiving first input selecting a parameter of an activity template selected from a plurality of activity templates that respectively define generalized activity sets, and second input identifying a controller tag of an industrial controller to may to the parameter of the activity template to yield a bound activity set, wherein the receiving the second input comprises
      receiving, at the MES device, information indicating that the industrial supports a data type associated with an equipment vendor of the MES device,
      enabling use of a conditionally enabled interface in the MES device in response to the information indicating that the industrial controller supports the data type, wherein the conditionally enabled interface facilitates browsing of data tags in the industrial controller from the MES device and enables referencing of data items on the MES device and the industrial controller using a common namespace, and
      disabling the use of the conditionally enabled interface in the MES device in response to the information indicating that the industrial controller does not support the data type; and
   storing the bound activity set as one of a plurality of activity sets, the plurality of activity sets defining respective workflows capable of execution by an MES system.

16. The non-transitory computer-readable medium of claim 15, the operations further comprising enabling a feature that facilitates discovery of data items on the industrial controller by the MES device in response to the information indicating that the industrial controller supports the data type.

17. The non-transitory computer-readable medium of claim 15, the operations further comprising enabling one or more security features of the MES device in response to the information indicating that the industrial controller supports the data type.

18. The non-transitory computer-readable medium of claim 15, wherein the activity sets respectively execute at least one of a business-level operation or a control-level operation to facilitate fulfillment of a defined business objective.

19. The non-transitory computer-readable medium of claim 18, the operations further comprising:
   translating a workflow defined by one of the plurality of activity sets into at least one control instruction; and
   deploying the at least one control instruction to the industrial controller.

20. The non-transitory computer-readable medium of claim 15, the operations further comprising sending request data to the industrial controller requesting confirmation information that indicates whether the industrial controller supports the data type.

\* \* \* \* \*